United States Patent
Shin et al.

(10) Patent No.: US 12,044,926 B2
(45) Date of Patent: Jul. 23, 2024

(54) DISPLAY DEVICE

(71) Applicant: LG ELECTRONICS INC., Seoul (KR)

(72) Inventors: Chanseob Shin, Seoul (KR); Woongjoon Hwang, Seoul (KR); Uihyung Lee, Seoul (KR); Baekki Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/389,454

(22) Filed: Nov. 14, 2023

(65) Prior Publication Data

US 2024/0168330 A1 May 23, 2024

(30) Foreign Application Priority Data

Nov. 22, 2022 (KR) .................. 10-2022-0156925

(51) Int. Cl.
  *G02F 1/13357* (2006.01)
(52) U.S. Cl.
  CPC .. *G02F 1/133605* (2013.01); *G02F 1/133608* (2013.01)
(58) Field of Classification Search
  CPC ............... G02F 1/133605; G02F 1/133608
  USPC .................................................. 349/61–68
  See application file for complete search history.

(56) References Cited

U.S. PATENT DOCUMENTS

| | | | |
|---|---|---|---|
| 11,428,986 B1* | 8/2022 | Liang | G02F 1/133611 |
| 2014/0368768 A1 | 12/2014 | Sakai | |
| 2016/0330838 A1* | 11/2016 | Park | G02F 1/133603 |

FOREIGN PATENT DOCUMENTS

| | | |
|---|---|---|
| CN | 111913324 | 11/2020 |
| EP | 2924497 | 9/2015 |
| JP | 2013143219 | 7/2012 |
| JP | 2012-190662 | 10/2012 |
| KR | 10-2019-0035452 | 4/2019 |
| KR | 10-2019-0116836 | 10/2019 |
| KR | 10-2339539 | 12/2021 |
| WO | 2013038802 | 3/2013 |

OTHER PUBLICATIONS

Korean Intellectual Property Office Application No. 10-2022-0156925, Office Action dated Mar. 15, 2024, 7 pages.
European Patent Office Application Serial No. 23211351.4, Search Report dated Apr. 17, 2024, 8 pages.

* cited by examiner

*Primary Examiner* — Charles S Chang
(74) *Attorney, Agent, or Firm* — LEE, HONG, DEGERMAN, KANG & WAIMEY

(57) ABSTRACT

A display device is provided. The display device includes: a display panel; a frame disposed at a rear of the display panel; a substrate and an optical assembly which are disposed between the display panel and the frame and are disposed on the frame, wherein the frame includes: a bottom having a first optical distance from the display panel; and a side support having a second optical distance, which is smaller than the first optical distance, from the display panel, wherein the substrate includes: a first plurality of substrates disposed on the bottom of the frame; and a second plurality of substrates disposed on the side support of the frame, wherein a spacing between the first plurality of substrates is greater than a spacing between the second plurality of substrates.

15 Claims, 19 Drawing Sheets

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2022-0156925, filed on Nov. 22, 2022, the contents of which are hereby incorporated by reference herein in its entirety.

BACKGROUND OF THE INVENTION

1. Field of the Invention

The following description relates to a display device.

2. Description of the Related Art

With the development of the information society, there have been growing demands for various types of display devices, and in order to meet these demands, various display devices, such as a liquid crystal display (LCD), an electroluminescent display (ELD), a vacuum fluorescent display (VFD), an organic light emitting diode (OLED), etc., have been studied and used recently.

Among these devices, the LCD panel includes a liquid crystal layer, and a TFT substrate and a color filter substrate which are positioned opposite each other with the liquid crystal layer sandwiched between the two substrates. The LCD panel displays images by using light provided by a backlight unit.

Recently, a backlight unit that provides light to a display panel is being actively researched to improve space efficiency of a display device.

SUMMARY OF THE INVENTION

It is an objective of the present disclosure to solve the above and other problems.

It is another objective of the present disclosure to provide a display device capable of improving space efficiency of a backlight unit.

It is yet another objective of the present disclosure to provide a display device including a backlight unit having various optical distances.

It is further another objective of the present disclosure to provide a display device including a reflective sheet capable of being applied according to various optical distances.

In accordance with an aspect of the present disclosure, the above and other objectives can be accomplished by providing a display device including: a display panel; a frame disposed at a rear of the display panel; a substrate and an optical assembly which are disposed between the display panel and the frame and are disposed on the frame, wherein the frame includes: a bottom having a first optical distance from the display panel; and a side support having a second optical distance, which is smaller than the first optical distance, from the display panel, wherein the substrate includes: a first plurality of substrates disposed on the bottom of the frame; and a second plurality of substrates disposed on the side support of the frame, wherein a spacing between the first plurality of substrates is greater than a spacing between the second plurality of substrates.

Effects of the Invention

The display device according to the present disclosure has the following effects.

According to at least one of the embodiments of the present disclosure, a display device capable of improving space efficiency of a backlight unit may be provided.

According to at least one of the embodiments of the present disclosure, a display device including a backlight unit having various optical distances may be provided.

According to at least one of the embodiments of the present disclosure, a display device including a reflective sheet capable of being applied according to various optical distances may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DETAILED DESCRIPTION OF THE PREFERRED EMBODIMENTS

Figure 1:
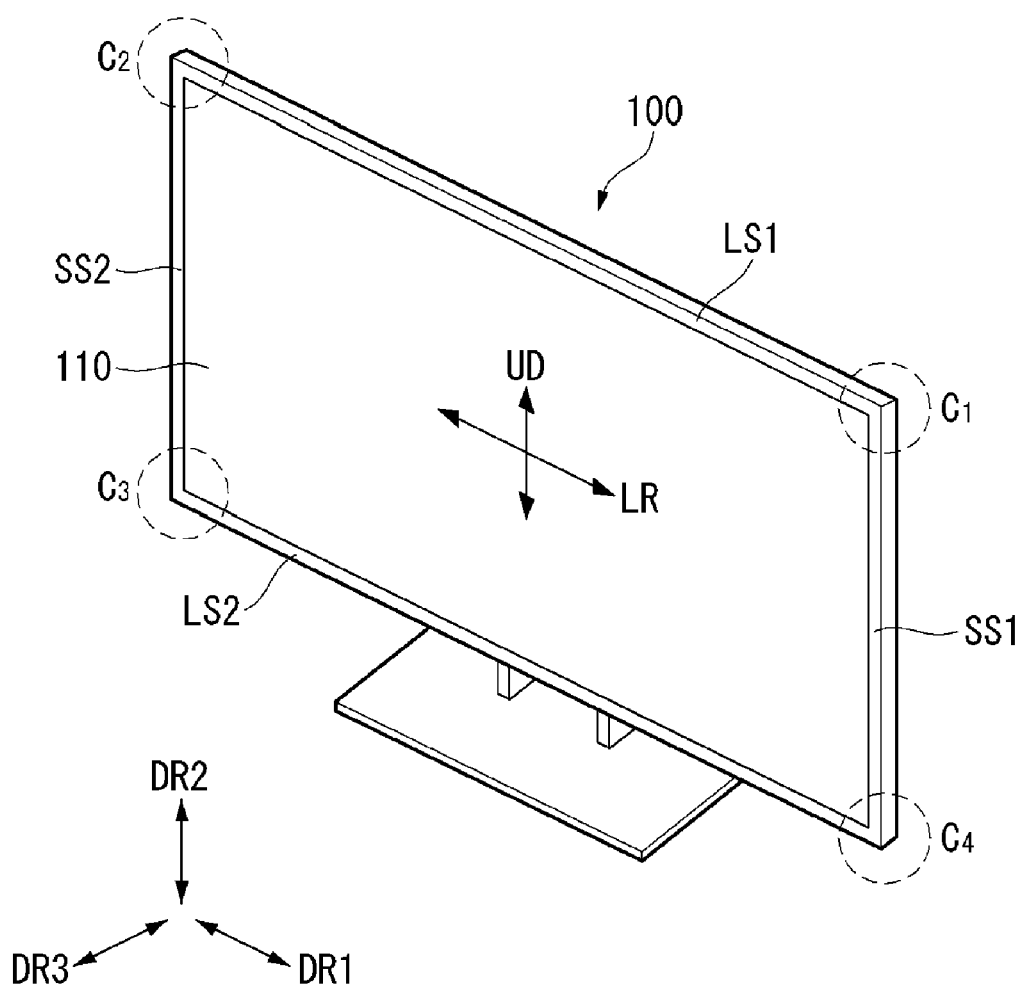
FIGS. 1 to 19 are diagrams illustrating examples of a display device according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role. In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, a display panel will be described using a Liquid Crystal Display (LCD) device as an example, but the display panel which may be applied to the present disclosure is not limited to the LCD panel.

Further, the display device 100 may include a first long side LS1, a second long side LS2 opposite to the first long side LS1, a first short side SS1 adjacent to the first long side LS1 and the second long side LS2, and a second short side SS2 opposite to the first short side SS1.

Here, an area of the first short side SS1 may be referred to as a first side area; an area of the second short side SS2 may be referred to as a second side area opposite to the first side area; an area of the first long side LS1 may be referred to as a third side area adjacent to the first side area and the second side area, and disposed between the first side area and the second side area; and an area of the second long side LS2 may be referred to as a fourth side area adjacent to the first side area and the second side area, disposed between the first side area and the second side area, and opposite to the third side area.

For convenience of explanation, it is illustrated and described that the first and second long sides LS1 and LS2 are longer than the first and second short sides SS1 and SS2, but there may also be a case in which the lengths of the first and second long sides LS1 and LS2 may be approximately equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side or a surface, on which the display device 100 displays an image, may be referred to as the front or a front side or front surface. When the display device 100 displays the image, a side or surface, at which the image may not be viewed, may be referred to as the rear or back or a rear side or rear surface or a back side or back surface. When the display device 100 is viewed from the front side or the front surface, the first long side LS1 may be referred to as the top or a top surface or an upper side or upper surface. The second long side LS2 may be referred to as the bottom or a bottom surface or a lower side or lower surface; the first short side SS1 may be referred to as the right or a right side or right surface; and the second short side SS2 may be referred to as the left or a left side or left surface.

The first long side LS1, the second long side LS2, the first short side SS1, and the second short side SS2 may be referred to as edges of the display device 100. Further, positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an up and down direction UD.

Figure 2:
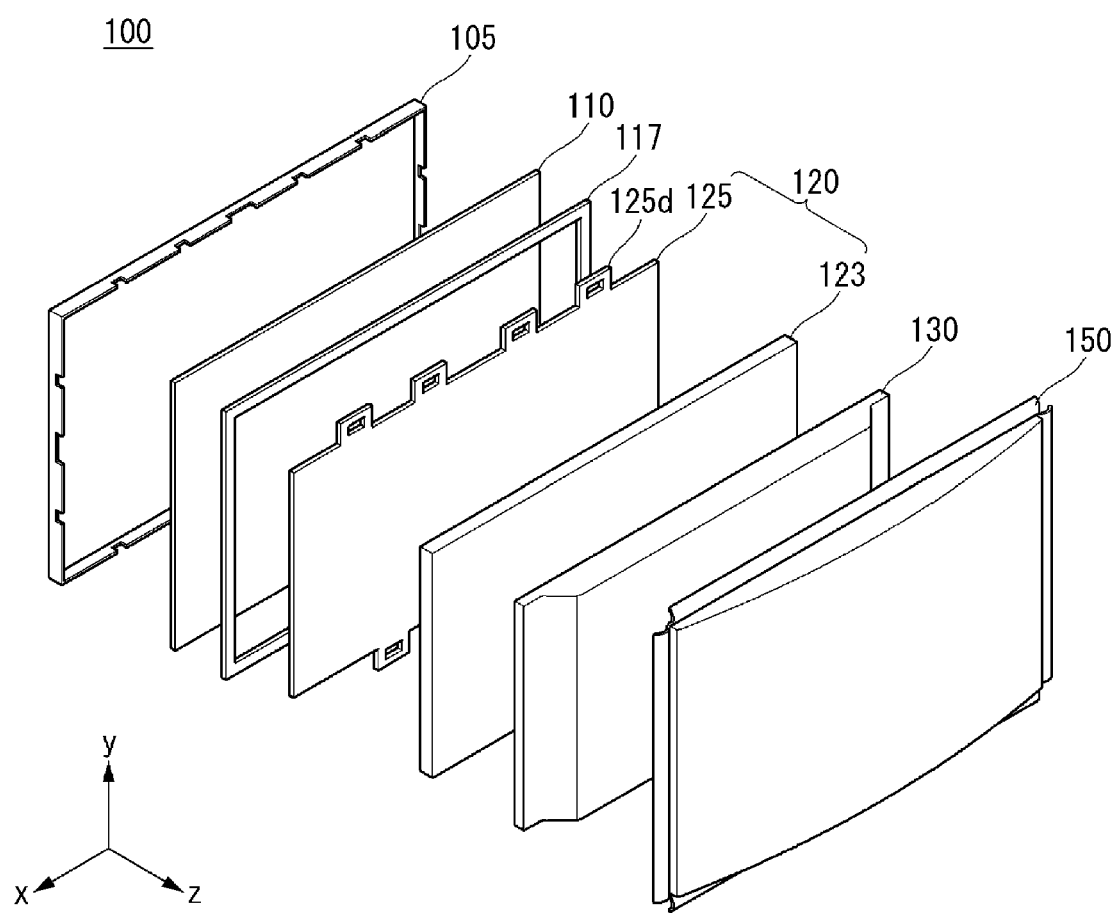

Referring to FIGS. 1 and 2, a display panel 110 may be disposed at the front of the display device 100 and may display images. The display panel 110 may include a plurality of pixels and may output an image while controlling color, brightness, and chroma of the respective pixels.

The display panel 110 may be divided into an active area, in which the image is displayed, and a de-active area in which the image is not displayed. The display panel 110 may include a front substrate and a rear substrate which are disposed opposite each other with a liquid crystal layer sandwiched between the two substrates.

The front substrate may include a plurality of pixels, each including red (R), green (G), and blue (B) subpixels. The front substrate may generate an image corresponding to red, green, or blue color in response to a control signal.

The rear substrate may include switching elements. The rear substrate may switch on or off pixel electrodes. For example, the pixel electrode may change a molecular arrangement of a liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transmit light, provided from a backlight unit 120, to the front substrate.

A front cover 105 may cover at least a portion of the front surface or a side surface of the display panel 110. The front cover 105 may be in the shape of a square frame with a hollow center.

The front cover 105 may be divided into a front surface cover and a side surface cover, i.e., a front surface cover disposed on a front surface of the display panel 110, and a side surface cover disposed on a side surface of the display panel 110. The front surface cover and the side surface cover may be provided separately. Any one of the front surface cover and the side surface cover may be omitted. For example, there may be a case in which only the side surface cover is provided without the front surface cover.

A guide panel 117 may be disposed at the rear of the display panel 110. The guide panel 117 may support a portion of the rear surface of the display panel 110. The guide panel 117 may make contact with an outer part of the display panel 110. The guide panel 117 may be coupled to the frame 130.

The backlight unit 120 may be disposed at the rear of the display panel 110. The backlight unit 120 may include a plurality of light sources. The backlight unit 120 may be of a direct type or an edge type.

The backlight unit 120 may be disposed on a front surface of the frame 130. For example, the plurality of light sources may be arranged on the front surface of the frame 130, in which case the backlight unit 120 may be collectively referred to as a direct-type backlight unit.

The backlight unit 120 may be driven by a full driving scheme or a partial driving scheme such as local dimming, impulsive driving, or the like. The backlight unit 120 may include an optical sheet 125 and an optical layer 123.

The optical sheet 125 may disperse light from the light sources. The optical sheet 125 may be composed of a plurality of layers. For example, the optical sheet 125 may include at least one prism sheet and/or at least one diffusion sheet.

The optical sheet 125 may include at least one coupling portion 125d. The coupling portion 125d may be coupled to the front cover 105, the frame 130, and/or the back cover 150. That is, the coupling portion 125d may be coupled directly to the front cover 105, the frame 130, and/or the back cover 150. Alternatively, the coupling portion 125d may be coupled to a structure that is coupled to the front cover 105 and/or the back cover 150. That is, the coupling portion 125d may be coupled indirectly to the front cover 105, the frame 130, and/or the back cover 150.

The optical layer 123 may include light sources and the like.

The frame 130 may support components of the display device 100. For example, the backlight unit 120 and the like may be coupled to the frame 130. The frame 130 may be formed of a metal material, such as an aluminum alloy and the like.

The back cover 150 may be disposed at the rear of the display device 100. The back cover 150 may protect internal components from external environments. At least a portion of the back cover 150 may be coupled to the frame 130 and/or the front cover 105. The back cover 150 may be a molded body of a resin material.

Figure 3:
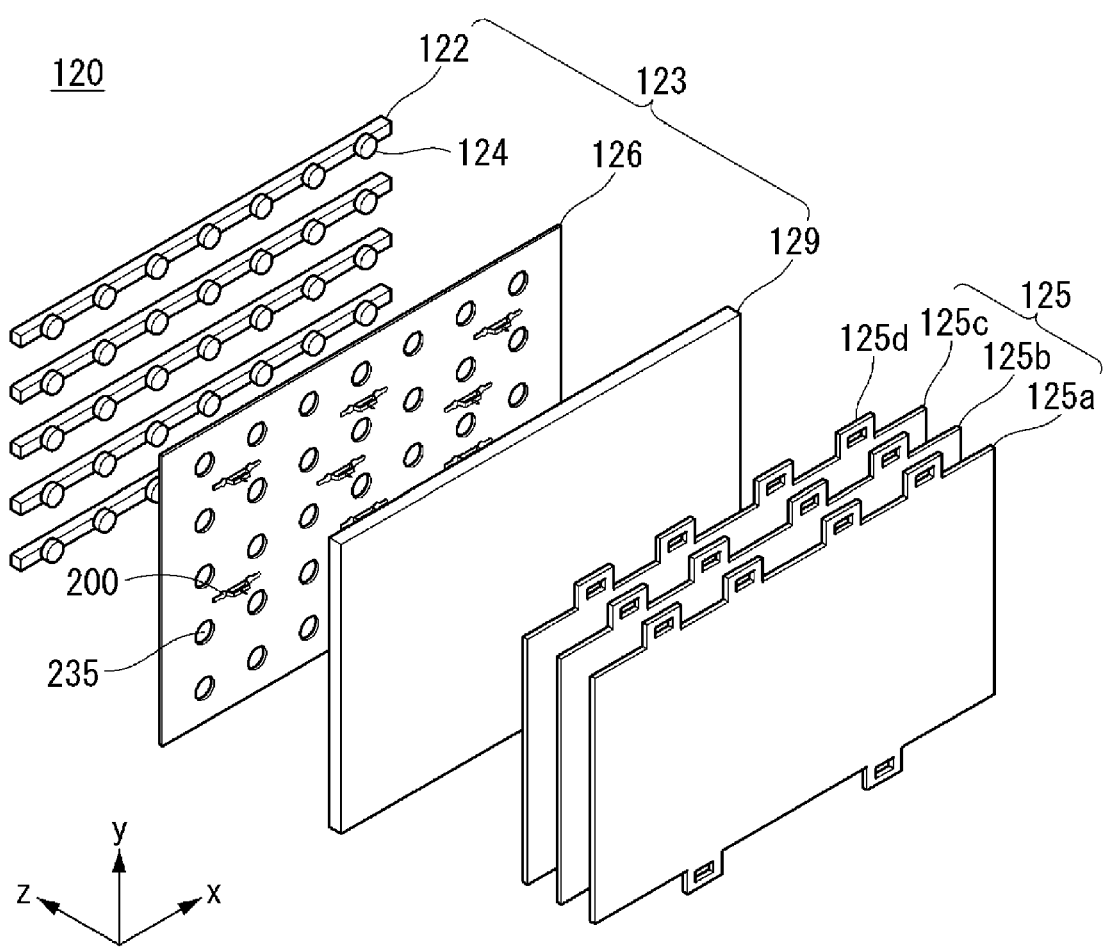

Referring to FIG. 3, the backlight unit 120 may include: the optical layer 123 including a substrate 122, at least one optical assembly 124, a reflective sheet 126, and a diffusion plate 129; and the optical sheet 125 disposed at the front of the optical layer 123. The configuration of the backlight unit 120 is not limited thereto, and any one or more of the components thereof may be omitted.

The substrate 122 may be in the shape of a plurality of straps which extend in a first direction and are spaced apart from each other by a predetermined distance in a second direction orthogonal to the first direction.

At least one optical assembly 124 may be mounted on the substrate 122. An electrode pattern for connecting an adapter and the optical assembly 124 may be formed on the substrate 122. For example, a carbon nano tube (CNT) electrode pattern may be formed on the substrate 122.

The substrate 122 may be made of at least one of polyethylene terephthalate (PET), glass, polycarbonate (PC), and silicone. The substrate 122 may be a printed circuit board (PCB).

The optical assemblies 124 may be arranged on the substrate 122 at predetermined intervals in a first direction. A diameter of the optical assembly 124 may be greater than a width of the substrate 122. That is, the diameter of the optical assembly 124 may be greater than the length of the substrate 122 in the second direction.

The optical assembly 124 may be a light emitting diode (LED) chip or an LED package including at least one LED chip.

The optical assembly 124 may be configured as a white LED or a colored LED emitting light of at least one of red, blue, and green. The colored LED may include at least one of a red LED, a blue LED, and a green LED.

A light source included in the optical assembly 124 may be of a chip-on-board (COB) type. The COB type may be a type formed by directly coupling an LED chip, which is a light source, to the substrate 122, thereby simplifying a manufacturing process. Also, resistance may be reduced, thereby reducing energy lost to heat. That is, power efficiency of the optical assembly 124 may be enhanced. The COB type may provide brighter lighting. The COB type may be made thinner and lighter than the prior art.

The reflective sheet 126 may be disposed on a front surface of the substrate 122. The reflective sheet 126 may have through holes 235, and the optical assemblies may be inserted into the through-holes 235.

The reflective sheet 126 may reflect light, provided from the optical assemblies 124, toward the front. Further, the reflective sheet 126 may cause light, reflected from the diffusion plate 129, to be reflected back toward the diffusion plate 129.

The reflective sheet 126 may contain at least one of a metal and metal oxide as reflective materials. For example, the reflective sheet 126 may include a metal and/or metal oxide with high reflectance, such as at least one of aluminum (Al), silver (Ag), gold (Au), and titanium dioxide ($TiO_2$).

The reflective sheet 126 may be formed by depositing and/or coating a metal or metal oxide on the substrate 122 or may be formed by printing ink containing a metal on the reflective sheet 126. A deposition layer, formed by thermal deposition, evaporation, or vacuum deposition such as sputtering, may be formed on the reflective sheet 126. A coated layer and/or a printed layer, formed by gravure coating or silk screen printing, etc., may be formed on the reflective sheet 126.

An air gap may be formed between the reflective sheet 126 and the diffusion plate 129. The air gap serves to widely diffuse light emitted from the optical assembly 124. In order to maintain the air gap, a supporter 200 may be disposed between the reflective sheet 126 and the diffusion plate 129. The air gap may be referred to as an optical gap or an optical depth.

A resin may be deposited on the optical assembly 124 and/or the reflective sheet 126. The resin serves to diffuse light emitted from the optical assembly 124. The diffusion plate 129 may allow light, emitted from the optical assembly 124, to diffuse upward.

The optical sheet 125 may be disposed at the front of the diffusion plate 129. A rear surface of the optical sheet 125 may face the diffusion plate 129, and a front surface of the optical sheet 125 may face the rear surface of the display panel 110.

The optical sheet 125 may include at least one or more sheets. Specifically, the optical sheet 125 may include one or more prism sheets and/or one or more diffusion sheets. The plurality of sheets included in the optical sheet 125 may be bonded to each other and/or closely adhered to each other.

The optical sheet 125 may include a plurality of sheets having different functions. For example, the optical sheet 125 may include first to third optical sheets 125a to 125c. The first optical sheet 125a may serve as a diffusion sheet, and the second and third optical sheets 125b and 125c may serve as prism sheets. The number and/or position of the diffusion sheet and the prism sheet may vary.

The diffusion sheet may prevent light, emitted from the diffusion plate, from being partially concentrated, thereby providing uniform distribution of light. The prism sheet may collect light emitted from the diffusion sheet to cause light to be incident perpendicular to the display panel 110.

The coupling portion 125d may be formed on at least one of the sides or edges of the optical sheet 125. The coupling portion 125d may be formed in at least one of the first to third optical sheets 125a to 125c.

The coupling portion 125d may be formed on the long sides or edges of the optical sheet 125. The coupling portion 125d, formed on a first long side, and the coupling portion 125d formed on a second long side may be asymmetrical to each other. For example, the coupling portion 125d on the first long side and the coupling portion 125d on the second long side may be different in position and/or number from each other.

Figure 4:
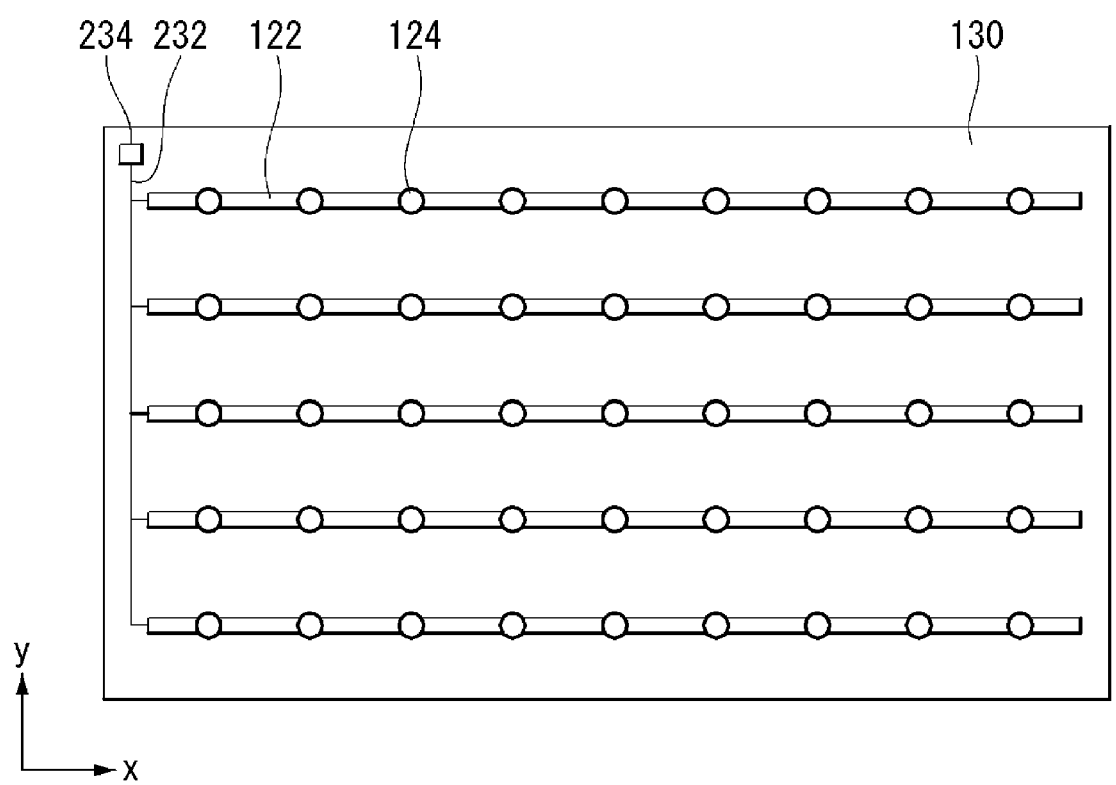

Referring to FIG. 4, the substrate 122 may be mounted on the frame 130. The substrate 122 includes a plurality of straps extending in a first direction and spaced apart from each other at predetermined intervals in a second direction orthogonal to the first direction. A plurality of substrates 122 may be connected on one side to a wire electrode 232.

The wire electrode 232 may extend in the second direction. The wire electrode 232 may be connected to one side of the substrate 122 with a predetermined distance therebetween in the second direction.

A wire hole 234 may be formed at one end of the wire electrode 232. The wire hole 234 may be a fine hole formed through the frame 130. The wire electrode 232 may extend to a rear surface of the frame 130 through the wire hole 234. The wire electrode 232 may be electrically connected to an adapter (not shown), disposed on the rear surface of the frame 130, through the wire hole 234.

The optical assemblies 124 may be arranged on the substrate 122 at predetermined intervals in the first direction. A diameter of the optical assembly 124 may be greater than the width of the substrate 122 in the second direction.

Figure 5:
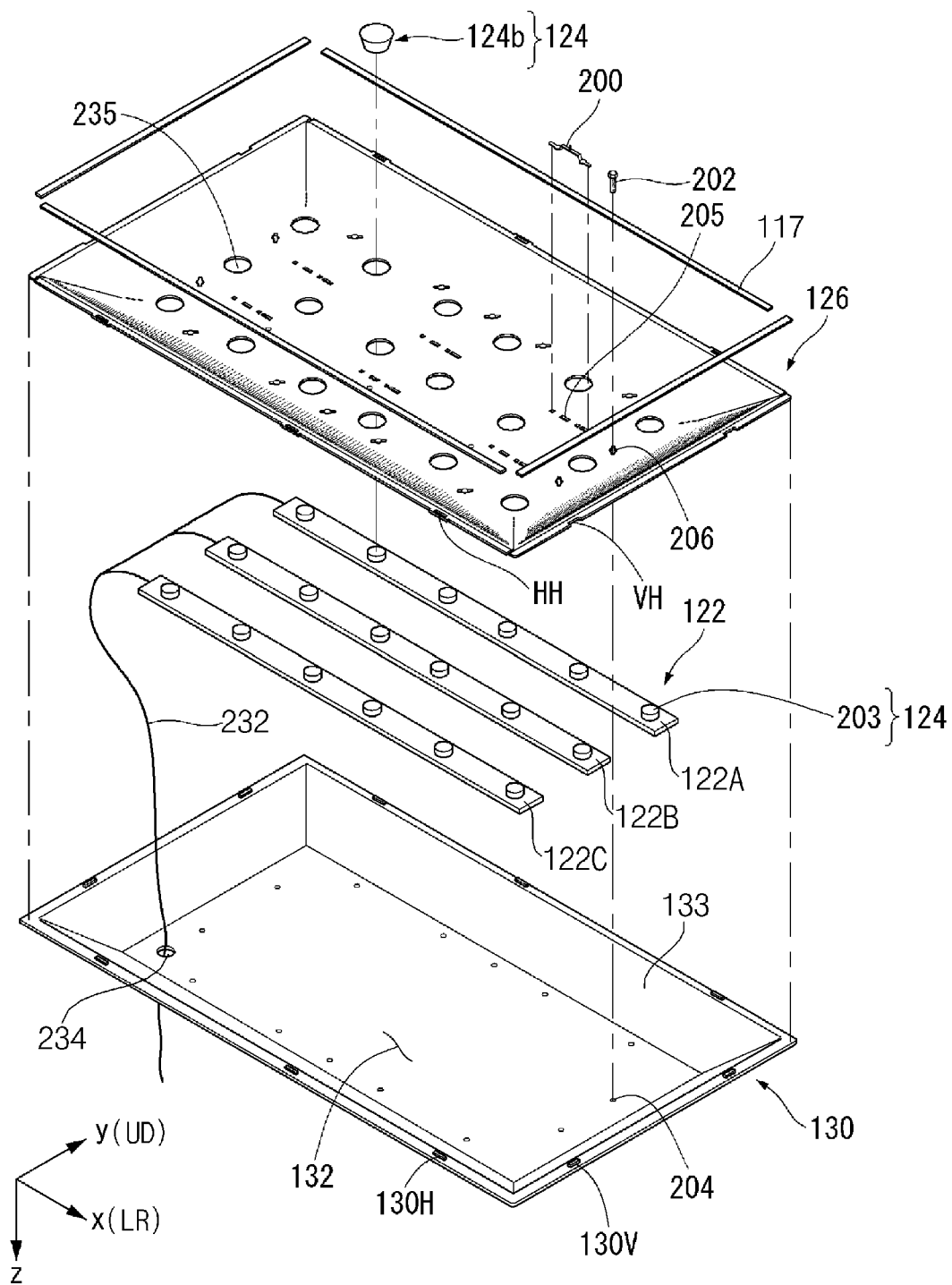

Referring to FIG. 5, the frame 130 may include a flat plate part 132 and an inclined part 133. The flat plate part 132 may have a plate shape. The inclined part 133 has a predetermined inclination with respect to the flat plate part 132 and may extend forward from the flat plate part 132. The frame 130 may have a generally tub shape. The reflective sheet 126 may have a generally tub shape corresponding to the shape of the frame 130. A space may be formed between the inclined part 133 and the reflective sheet 126.

The substrate 122 may be mounted or disposed on the flat plate part 132. A plurality of substrates 122 may be sequentially arranged. The plurality of substrates 122 may be spaced apart from each other. For example, a first substrate 122A is elongated in the left and right direction LR of the frame 130, and the left and right direction LR of the frame 130 may be positioned in a longitudinal direction. A second substrate 122B is elongated in the left and right direction LR of the frame 130 but is mounted on the frame 130 at a position spaced apart from the first substrate 122A. A third substrate 122C is elongated in the left and right direction LR of the frame 130 but is mounted on the frame 130 at a position spaced apart from the second substrate 122B.

A spacing between the substrates 122 may vary depending on a pixel number of the display panel 110 (see FIG. 2). For example, a spacing between the substrates 122 for providing light to the display panel 110 that displays an 8k quality image may be smaller than a spacing between the substrates 122 for providing light to the display panel 110 that displays a 4k quality image. If a pixel number of the display panel 110 increases or an image quality of the display panel 110 increases, light transmittance of the display panel 110 may be reduced. To this end, a large number of substrates 122 may be arranged in order to increase brightness of light provided by the backlight unit 120 (see FIG. 3).

The reflective sheet 126 may have the through-holes 235. A plurality of through-holes 235 may correspond to the number of a plurality of light assemblies 124. The reflective sheet 126 may be placed on the frame 130 and/or the substrate 122. In this case, lenses 124b of the plurality of optical assemblies 124 may be inserted into the plurality of through-holes 235 to protrude above the reflective sheet 126. The reflective sheet 126 may be coupled or fixed to the frame 130 by a fixing member 202. The supporter 200 may be mounted on the reflective sheet 126.

Coupling ribs 130H and 130V may be formed at an upper end of the inclined part 133 of the frame 130. The reflective sheet 126 has coupling holes VH and HH, such that the coupling ribs 130H and 130V may be inserted into the coupling holes VH and HH. Accordingly, the reflective sheet 126 may be fixed onto the frame 130.

The guide panel 117 may be formed on an outer part of the reflective sheet 126 and may be coupled to the frame 130. The guide panel 117 may support the display panel 110 (see FIG. 2). The guide panel 117 may be located on four sides of the reflective sheet 126.

Figure 6:
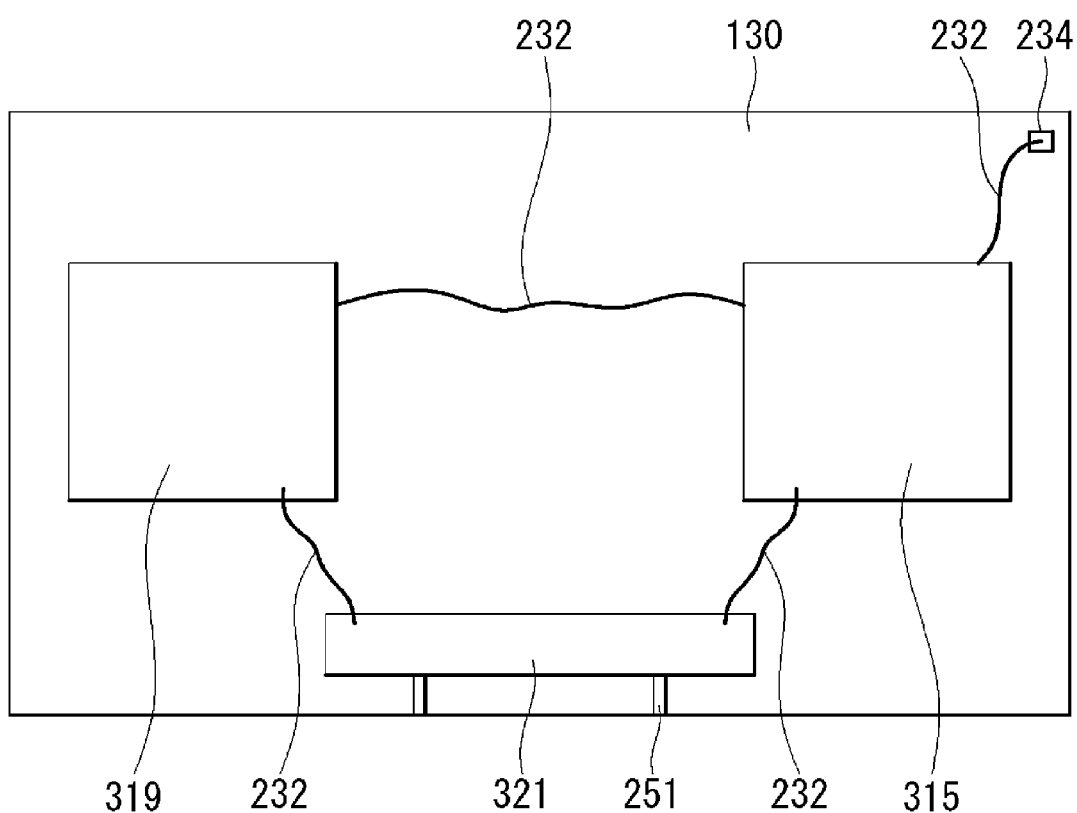

Referring to FIG. 6, the wire electrode 232, extending from the front surface of the frame 130 through the wire hole 234, may be electrically connected to a power supply 315. The power supply 315 may be a printed circuit board for supplying power to the display device 100. The power supply 315 may convert AC power into DC power.

The power supply 315 may supply power to the optical assembly 124 through the wire electrode 232. The power supply 315 may be electrically connected to a main board 321 through the wire electrode 232. The main board 321 may be spaced apart from the power supply 315 by a predetermined distance.

The main board 321 may be a printed circuit board that provides an interface for operating the display device 100. In addition, the main board 321 may check and control the operating state of the respective components of the display device 100.

The main board 321 and the power supply 315 may be connected to a timing control board 319 through the wire electrode 232. The timing control board 319 may be a printed circuit board that transmits electric power or signals received from the main board 321 or the power supply 315 to the display panel 110. The timing control board 319 may be electrically connected to the display panel 110 positioned at the front of the frame 130 via a flat flexible cable (FFC cable) 251.

While FIG. 6 illustrates an example in which the respective printed circuit boards are connected to each other, the embodiments of the present disclosure are not limited thereto, and only at least some of the printed circuit boards may be connected to each other.

Figure 7:
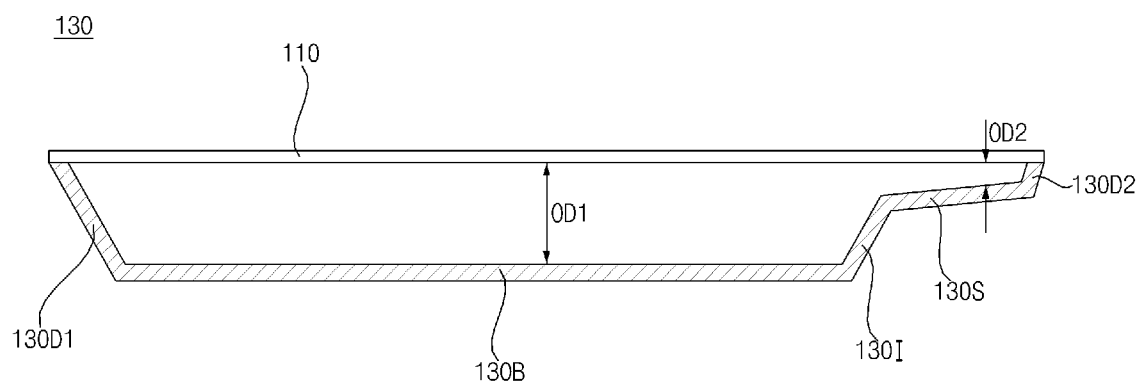

Referring to FIG. 7, the frame 130 may include a bottom 130B and a side support 130S. The bottom 130B may be a flat plate. The side support 130S may be disposed on one side of the bottom 130B and may be disposed closer to the display panel 110 than the bottom 130B. The side support 130S may be referred to as a side bottom 130S.

For example, the bottom 130B and the side support 130S may form a step. The frame 130 may have a stepped portion 1301. The stepped portion 1301 may extend from the bottom 130B to the side support 130S. For example, the stepped portion 1301 may be inclined.

A distance OD1 from the display panel 110 to the bottom 130B may be greater than a distance OD2 from the display panel 110 to the side support 130S. The distances OD1 and OD2 may be referred to as optical distances.

The frame 130 may include side parts 130D1 and 130D2. The side parts 130D1 and 130D2 may form a periphery of the bottom 130B of the frame 130 and/or a periphery of the side support 130S of the frame 130. The first side part 130D1 may form a periphery of the bottom 130B of the frame 130, and a second side part 130D2 may form a periphery of the side support 130S of the frame 130.

Figure 8:
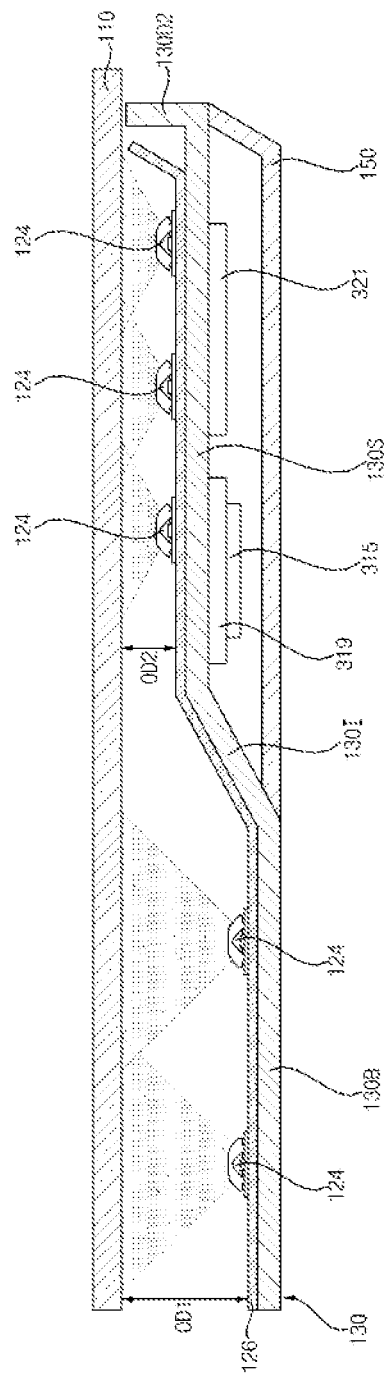
Figure 11:
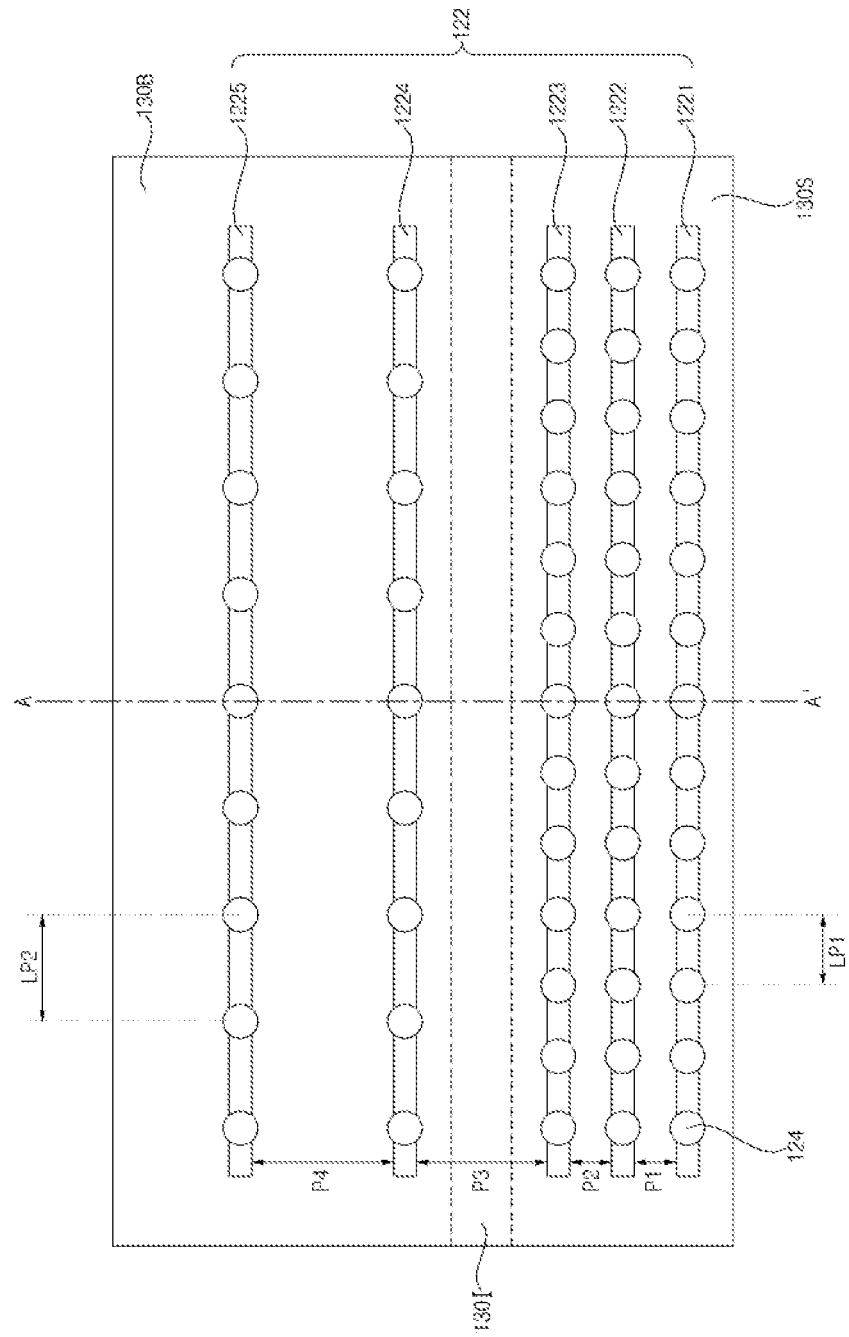

Referring to FIGS. 8 and 11, the display panel 110 may be coupled to the frame 130. The display panel 110 may be disposed at the front of the frame 130. The first optical distance OD1 may be formed between the bottom 130B and the display panel 110, and the second optical distance OD2 may be formed between the side support 130S and the display panel 110. The first optical distance OD1 may be greater than the second optical distance OD2.

The substrate 122 and the optical assembly 124 may be disposed between the display panel 110 and the frame 130. The optical assembly 124 may be mounted on the substrate 122, and the substrate 122 may be disposed on the frame 130.

There may be a plurality of substrates 122. A first substrate 1221, a second substrate 1222, and a third substrate 1223 may be disposed on the side support 130S, and a fourth substrate 1224 and a fifth substrate 1225 may be disposed on the bottom 130B. A first pitch P1 may be formed between the first substrate 1221 and the second substrate 1222, and a second pitch P2 may be formed between the second substrate 1222 and the third substrate 1223. A third pitch P3 may be formed between the third substrate 1223 and the fourth substrate 1224. A fourth pitch P4 may be formed between the fourth substrate 1224 and the fifth substrate 1225.

For example, the first pitch P1 may be substantially equal to the second pitch P2, and the fourth pitch P4 may be greater than the first pitch P1 and/or the second pitch P2. In another example, the third pitch P3 may be smaller than the fourth pitch P4 and may be greater than the first pitch P1 and/or the second pitch P2.

The optical assemblies 124 may be arranged on the substrate 122 at predetermined intervals. A spacing between the optical assemblies 124 arranged on the first substrate 1221, the second substrate 1222, and/or the third substrate 1223 may be referred to as a first lens pitch LP1. A spacing between the optical assemblies 124 arranged on the fourth substrate 1224 and/or the fifth substrate 1225 may be referred to as a second lens pitch LP2. For example, the first lens pitch LP1 may be smaller than the second lens pitch LP2.

The main board 321, the power supply unit 315, and/or the timing control board 319, and the like may be mounted on a rear surface of the side support 130S. A back cover 150 may be disposed at the rear of the side support 130S and may cover the main board 321, the power supply unit 135, and/or the timing control board 319. The back cover 150 may be fixed to the frame 130 while covering the rear surface of the side support 130S.

The reflective sheet 126 may be disposed on the frame 130 while covering the substrate 122. The optical assembly 124 may pass through the reflective sheet 126.

Figure 9:
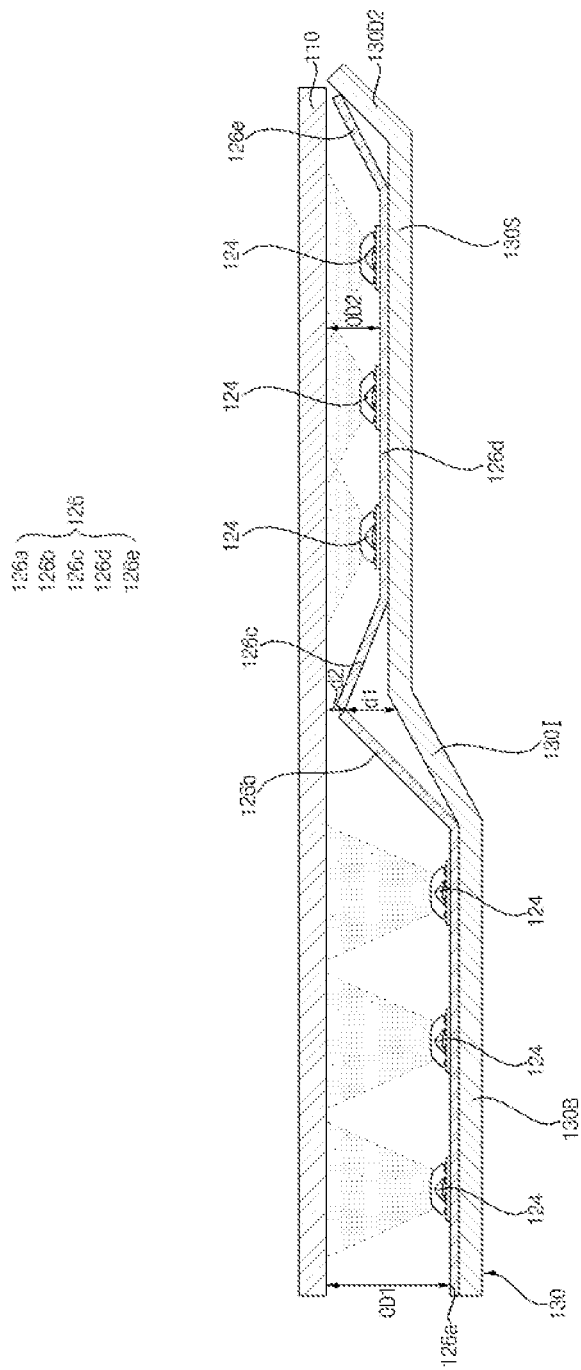

Referring to FIG. 9, the reflective sheet 126 may include a first part 126a, a second part 126b, a third part 126c, a fourth part 126d, and a fifth part 126e. The first part 126a may be disposed on the bottom 130B of the frame 130. The fourth part 126d may be disposed on the side support 130S of the frame 130. The first part 126a and the fourth part 126d may cover the substrate 122 (see FIG. 11). The optical assembly 124 may pass through the reflective sheet 126.

The second part 126b may extend from the first part 126a. The second part 126b may be folded relative to the first part 126a. The second part 126b may be disposed above the stepped portion 1301. The second part 126b may be spaced apart from the stepped portion 1301. The third part 126c may extend from the fourth part 126d or may be folded relative to the fourth part 126d. The third part 126c may be disposed above the stepped portion 1301 and/or the side support 130S. The third part 126c may be spaced apart from the stepped portion 1301 and/or the side support 130S. The third part 126c may make contact with the second part 126b. The fifth part 126e may extend from the fourth part 126d or may be folded relative to the fourth part 126d.

For example, an end edge of the second part 126b may make contact with an end edge of the third part 126c. The end edges of the second part 126b and the third part 126c may be disposed closer to the display panel 110 than the stepped portion 1301 or the side support 130S. For example, a first distance d1 from the end edges of the second part 126b and the third part 126c to the stepped portion 1301 may be greater than a second distance d2 from the display panel 110 to the end edges of the second part 126b and the third part 126c. Accordingly, a dark area, formed in the display panel 110 and corresponding to the stepped portion 1301, may be improved.

Figure 10:
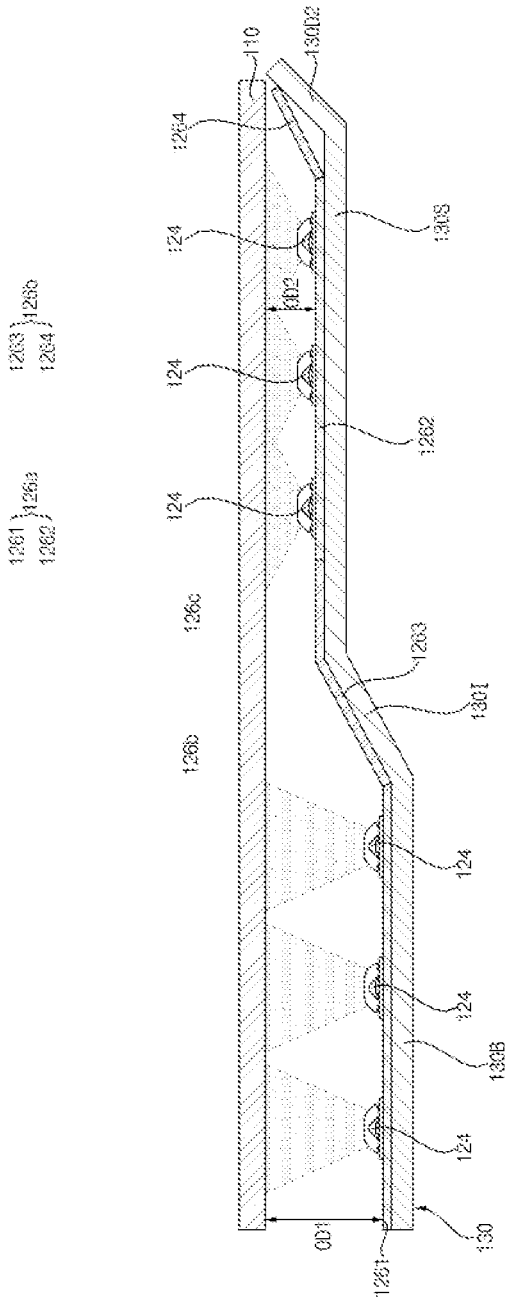

Referring to FIG. 10, the reflective sheet 126a may include a first part 1261 and a second part 1262. The reflective part 126b may include a first region 1263 and a second region 1264. For example, the reflective sheet 126a may be disposed on the frame 130 and/or the substrate 122 (see FIG. 11), and the reflective part 126b may be printed on the front surface of the frame 130 or may be formed as a molded body. In another example, a front surface of the reflective part 126b may be coated with a reflective material, and a rear surface thereof may be coated with an adhesive material to be fixed or adhered to the front surface of the frame 130. A reflectance of the reflective part 126b may be greater than a reflectance of the reflective sheet 126a.

The first part 1261 may be disposed on the bottom 130B of the frame 130. The first part 1261 may cover the bottom 130B of the frame 130 and/or the substrate 122 (see FIG. 11). The second part 1262 may be disposed on the side support 130S of the frame 130. The second part 1262 may cover the side support 130S of the frame 130 and/or the substrate 122 (see FIG. 11).

The first region 1263 may be formed on the stepped portion 1301 and/or the side support 130S. The first region 1263 may connect the first part 1261 and the second part 1262. For example, a reflectance of the first region 1263 may be greater than a reflectance of the first part 1261 and may be substantially equal to a reflectance of the second part 1262. In another example, the reflectance of the first region 1263 may be greater than the reflectance of the second part 1262.

The second region 1264 may be formed in the second side part 130D2. The second region 1264 may be connected to the second part 1262. For example, a reflectance of the second region 1264 may be greater than the reflectance of the second part 1262.

Accordingly, in a section where the optical distances OD1 and OD2 vary, uniformity of light provided to the display panel 110 may be improved.

Figure 12:
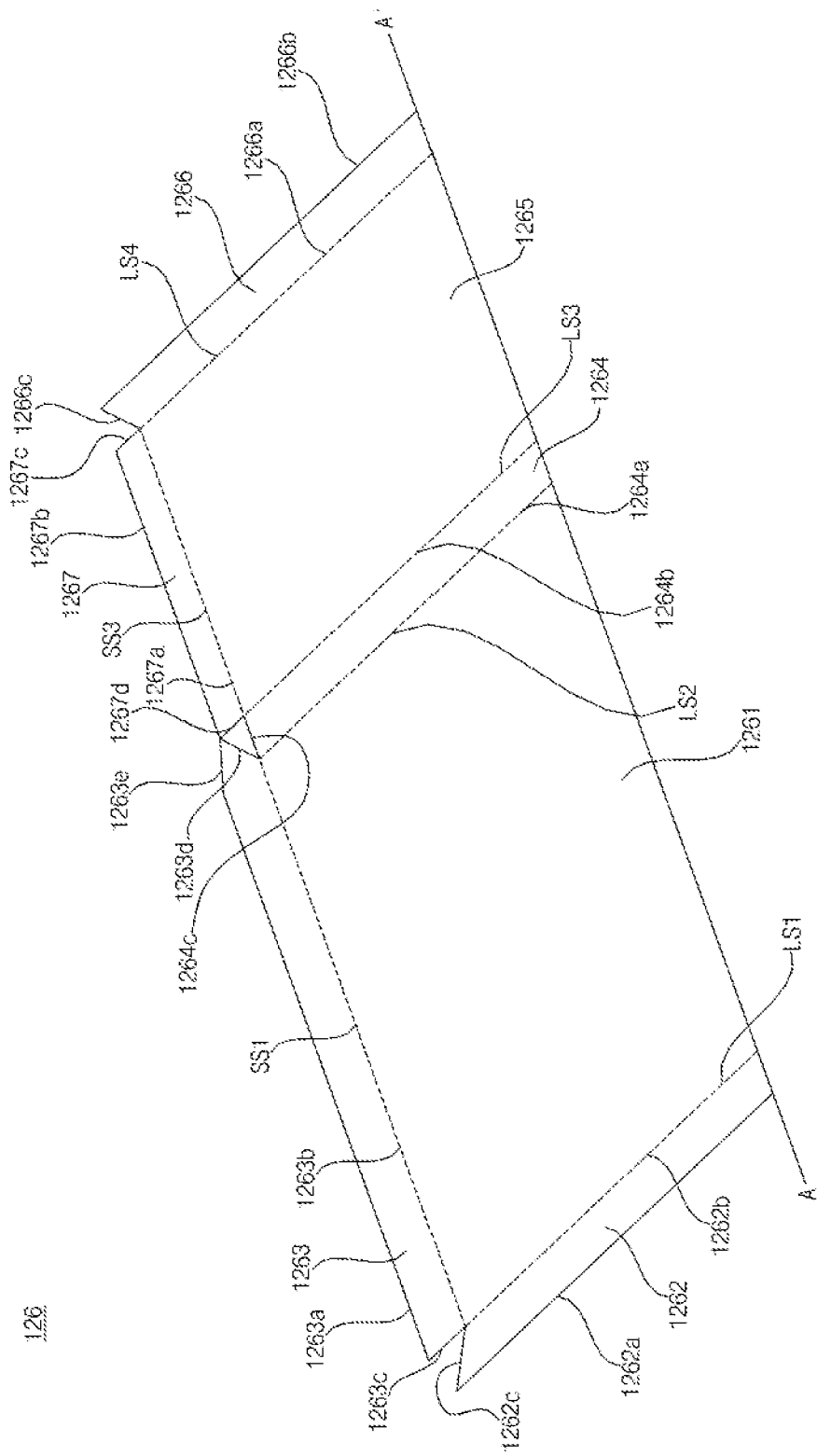
Figure 13:
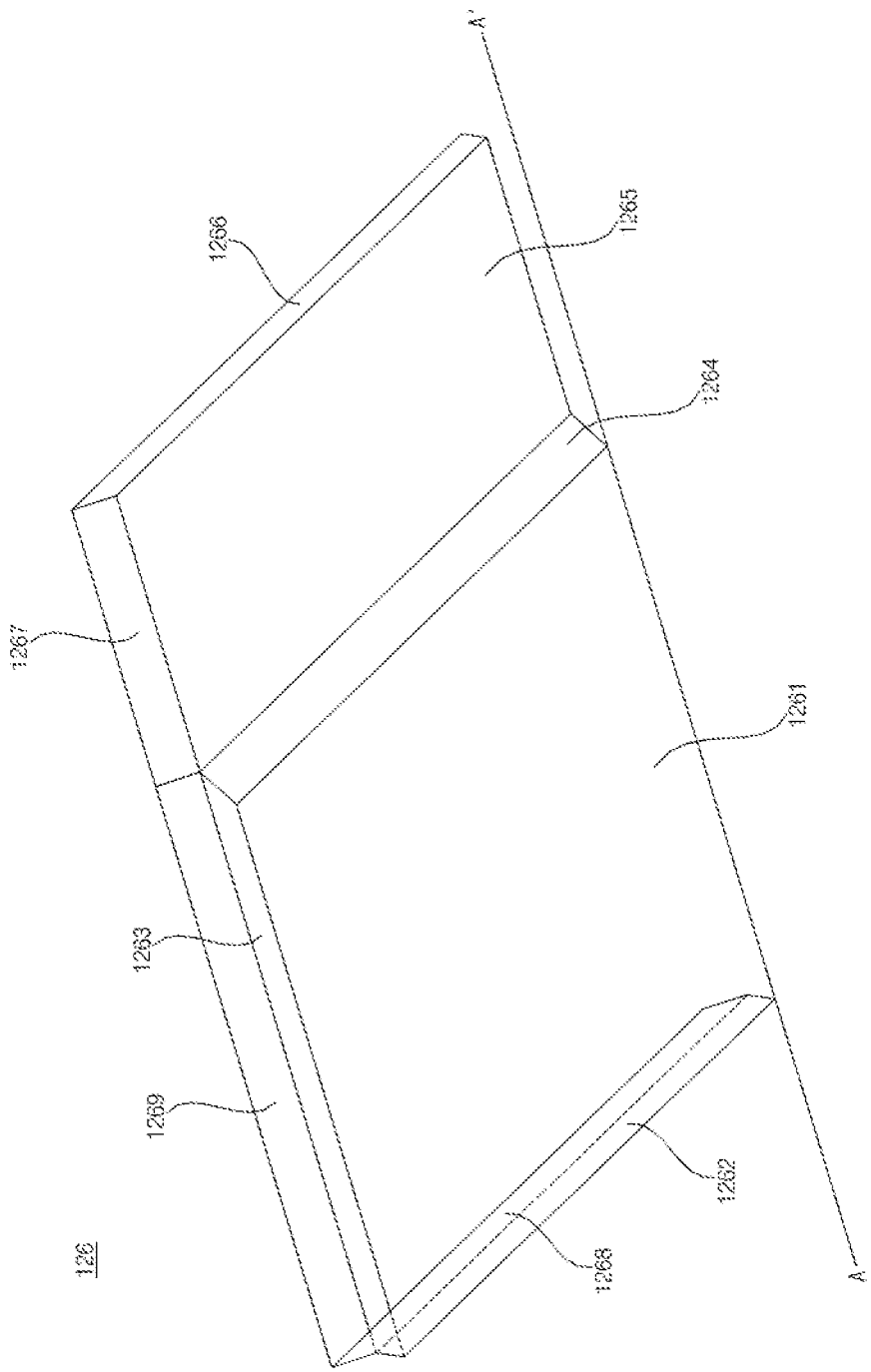

Referring to FIGS. 12 and 13 along with FIG. 8, the reflective sheet 126 may include a plurality of sheet parts 1261, 1262, 1263, 1264, 1265, 1266, and 1267. The reflective sheet 126 may be symmetrical about a center line A-A'. A first sheet 1261 may be disposed on the bottom 130B of the frame 130. The first sheet 1261 may maintain the first optical distance OD1 from the display panel 110. The first sheet 1261 may have a rectangular shape.

The second sheet 1262 may be connected to the first long side LS1 of the first sheet 1261. The second sheet 1262 may be elongated along the first long side LS1 of the first sheet 1261. The second sheet 1262 may be disposed on the first side part 130D1 of the frame 130. For example, the second sheet 1262 may be folded relative to the first sheet 1261, and a boundary between the first sheet 1261 and the second sheet 1262 is defined by a dashed line, and may be cut and connected at regular intervals. An end of the second sheet 1262 may have a right triangle shape.

The second sheet 1262 may include a first side 1262a, a second side 1262b, and a third side 1262c. The second side 1262b may form the boundary between the first sheet 1261 and the second sheet 1262 along with the first long side LS1 of the first sheet 1261. The first side 1262a may face the second side 1262b, and a length of the first side 1262a may be greater than a length of the second side 1262b. The third side 1262c may connect the first side 1262a and the second side 1262b. The third side 1262c may form an acute angle with respect to the first side 1262a and may form an obtuse angle with respect to the second side 1262b.

The third sheet 1263 may be connected to the first short side SS1 of the first sheet 1261. The third sheet 1263 may be elongated along the first short side SS1 of the first sheet 1261. The third sheet 1263 may be disposed on the first side part 130D1 of the frame 130. For example, the third sheet 1263 may be folded relative to the first sheet 1261, and a boundary between the first sheet 1261 and the third sheet 1263 is defined by a dashed line, and may be cut and connected at regular intervals.

The third sheet 1263 may include a first side 1263a, a second side 1263b, a third side 1263c, a fourth side 1263d, and a fifth side 1263e. The second side 1263b may form the boundary between the first sheet 1261 and the third sheet 1263 along with the first short side SS1 of the first sheet 1261. The first side 1263a may face the second side 1263b. A length of the first side 1263a may be substantially equal to a length of the second side 1263b. The third side 1263c may connect one end of the first side 1263a and one end of the second side 1263b. The fourth side 1263d may be connected to another end of the second side 1263b. The fifth side 1263e may be connected to another end of the first side 1263a. The fourth side 1263d may be connected to the fifth side 1263e. The fourth side 1263d and the fifth side 1263e may have a generally wedge shape. The fourth side 1263d may form an acute angle with respect to the second side 1263b, and the fifth side 1263e may form an obtuse angle with respect to the first side 1263a.

The fourth sheet 1264 may be connected to the second long side LS2 of the first sheet 1261. The second long side LS2 may face the first long side LS1 and may be parallel to the first long side LS1. A length of the second long side LS2 may be substantially equal to a length of the first long side LS1. For example, the fourth sheet 1264 may be folded relative to the first sheet 1261, and a boundary between the first sheet 1261 and the fourth sheet 1264 is defined by a dashed line, and may be cut and connected at regular intervals. The fourth sheet 1264 may be disposed on the stepped portion 130I of the frame 130.

The fourth sheet 1264 may include a first side 1264a, a second side 1264b, and a third side 1264c. The first side 1264a may overlap the second long side LS2 of the first sheet 1261. The second side 1264b may face the first side 1264a and may be parallel to the first side 1264a. The third side 1264c may connect the first side 1264a and the second side 1264b.

The fifth sheet 1265 may be disposed on the side support 130S of the frame 130. The fifth sheet 1265 may maintain a second optical distance OD2 from the display panel 110. The fifth sheet 1265 may have a rectangular shape. The fifth sheet 1265 may include a first long side LS3, a second long side LS4, and a first short side SS3. The first long side LS3 may face the second long side LS2 of the first sheet 1261 and may be parallel to the second long side LS2. A length of the first long side LS3 of the fifth sheet 1265 may be substantially equal to a length of the second long side LS2 of the first sheet 1261. The second long side LS4 may face the first long side LS3 and may be parallel to the first long side LS3. A length of the second long side LS4 of the fifth sheet 1265 may be substantially equal to a length of the first long side LS3. The first short side SS3 of the fifth sheet 1265 may connect the first long side LS2 and the second long side LS4. A length of the first short side SS3 of the fifth sheet 1265 may be smaller than a length of the first short side SS1 of the first sheet 1261.

The sixth sheet 1266 may be connected to the second long side LS4 of the fifth sheet 1265. The sixth sheet 1266 may be elongated along the second long side LS4 of the fifth sheet 1265. For example, the sixth sheet 1266 may be folded relative to the fifth sheet 1265, and a boundary between the fifth sheet 1265 and the sixth sheet 1266 is defined by a dashed line, and may be cut and connected at regular intervals. The sixth sheet 1266 may be disposed on the second side part 130D2 of the frame 130.

The sixth sheet 1266 may include a first side 1266a, a second side 1266b, and a third side 1266c. The first side 1266a of the sixth sheet 1266 may overlap the second long side LS4 of the fifth sheet 1265. The second side 1266b may face the first side 1266a and may be parallel to the first side 1266a. A length of the second side 1266b may be greater than a length of the first side 1266a. The third side 1266c may connect the first side 1266a and the second side 1266b. The third side 1266c may form an obtuse angle with respect to the first side 1266a and may form an acute angle with respect to the second side 1266b.

A seventh sheet 1267 may be connected to the first short side SS3 of the fifth sheet 1265. The seventh sheet 1267 may be elongated along the first short side SS3 of the fifth sheet 1265. For example, the seventh sheet 1267 may be folded relative to the fifth sheet 1265, and a boundary between the fifth sheet 1265 and the seventh sheet 1267 is defined by a dashed line, and may be cut and connected at regular intervals. The seventh sheet 1267 may be disposed on the second side part 130D2 of the frame 130.

The seventh sheet 1267 may include a first side 1267a, a second side 1267b, a third side 1267c, and a fourth side 1267d. The first side 1267a may overlap the first short side SS3 of the fifth sheet 1265. The second side 1267b may face the first side 1267a or may be parallel to the first side 1267a. A length of the second side 1267b may be substantially equal to a length of the first side 1267a. The third side 1267c may connect one end of the first side 1237a and one end of the second side 1267b, and the fourth side 1267d may connect another end of the first side 1267a and another end of the second side 1267b. The fourth side 1267d may face the third side 1267c or may be parallel to the third side 1267c.

As the second sheet 1262 is folded relative to the first sheet 1261 and the third sheet 1263 is folded relative to the first sheet 1261, the third side 1262c of the second sheet 1262 may make contact with the third side 1263c of the third sheet 1263.

As the third sheet 1263 is folded relative to the first sheet 1261 and the fourth sheet 1264 is folded relative to the first sheet 1261, the fourth side 1263d of the third sheet 1263 may make contact with the third side 1264c of the fourth sheet 1264.

As the seventh sheet 1267 is folded relative to the fifth sheet 1265, the third sheet 1263 is folded relative to the first sheet 1261, the fourth sheet 1264 is folded relative to the first sheet 1261, and the fifth sheet 1265 is folded relative to the fourth sheet 1264, the fifth side 1263e of the third sheet 1263 may make contact with the fourth side 1267d of the seventh sheet 1267.

As the seventh sheet 1267 is folded relative to the fifth sheet 1265 and the sixth sheet 1266 is folded relative to the fifth sheet 1265, the third side 1267c of the seventh sheet 1267 may make contact with the third side 1266c of the sixth sheet 1266.

Accordingly, the reflective sheet 126 may be placed on the bottom 130B, the side support 130S, the stepped portion 130I, and/or the side parts 130D1 and 130D2 of the frame 130.

Figure 14:
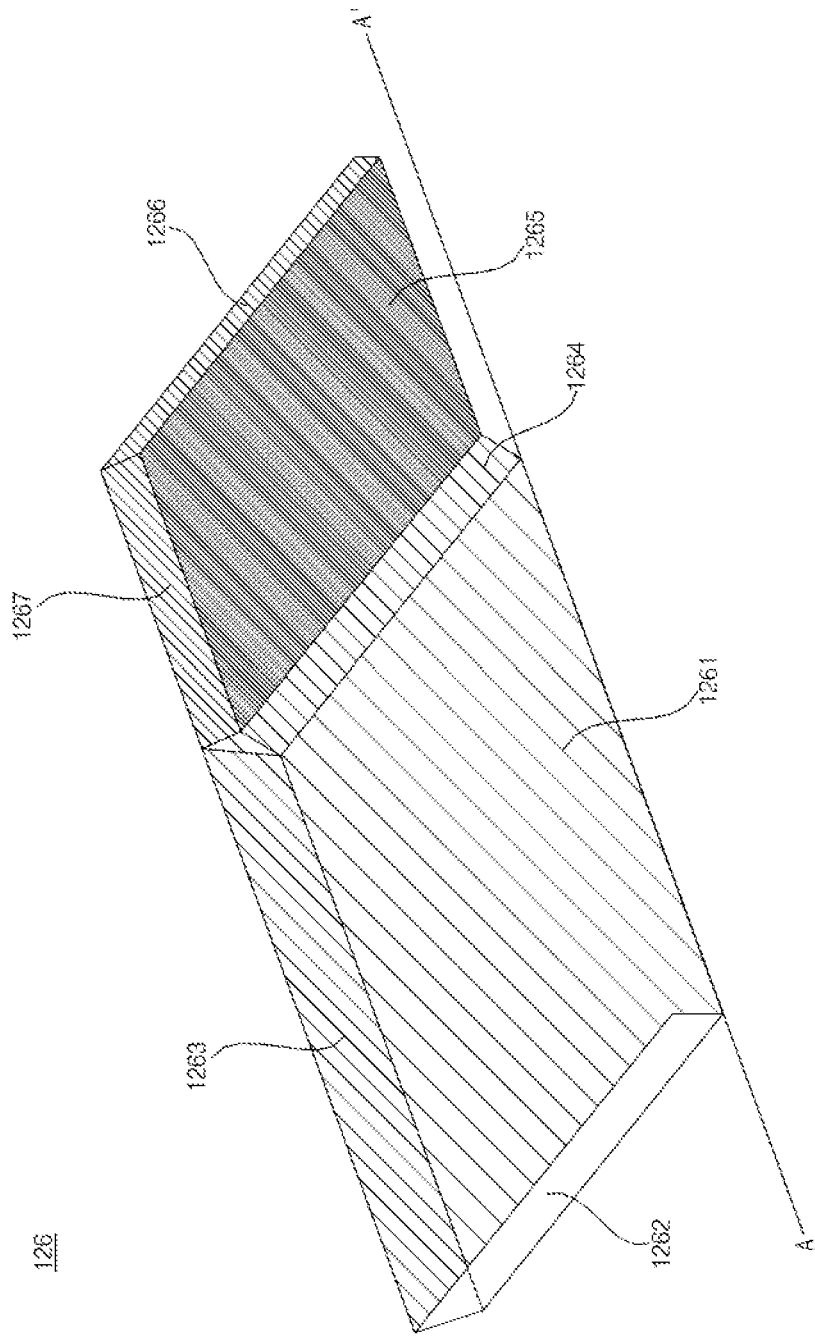
Figure 15:
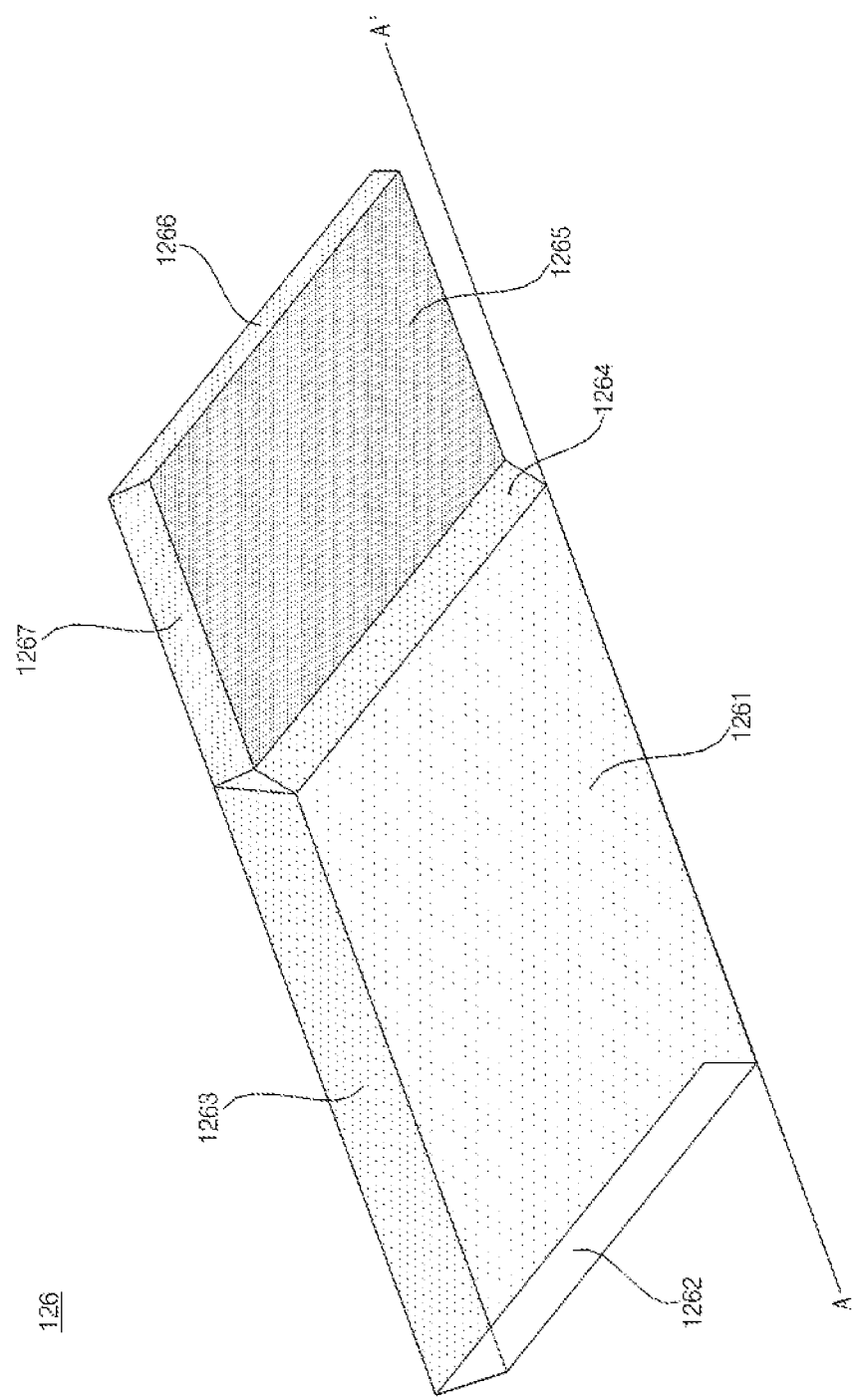

Referring to FIGS. 14 and 15, a reflectance of the first sheet 1261 may be greater than a reflectance of the second sheet 1262, the third sheet 1263, and/or the fourth sheet

1264. The reflectance of the second sheet 1262 may be substantially equal to the reflectance of the third sheet 1263 and/or the fourth sheet 1264. A reflectance of a sheet portion, defined by the third sheet 1263, the fourth sheet 1264, and the seventh sheet 1267, may be substantially equal to the reflectance of the first sheet 1261.

A reflectance of the fifth sheet 1265 may be lower than a reflectance of the sixth sheet 1266 and/or the seventh sheet 1267. The reflectance of the sixth sheet 1266 and/or the seventh sheet 1267 may be lower than the reflectance of the third sheet 1263 and/or the fourth sheet 1264. The reflectance of the sixth sheet 1266 may be substantially equal to the reflectance of the seventh sheet 1267.

For example, a reflective material and/or a light absorbing material may be applied to the reflective sheet 126, and the reflectance of the reflective sheet 126 may be adjusted by adjusting concentration of the reflective material and/or the light absorbing material. In another example, a dot pattern may be formed on the reflective sheet 126. The reflectance of the reflective sheet 126 may be adjusted by adjusting the size, spacing, number density, color, and the like of the dot pattern. The dot pattern may be formed by punching the reflective sheet 126. By adjusting the reflectance of the reflective sheet 126 through the punched holes, the size, spacing, number density, and the like of the holes may be adjusted.

Accordingly, it is possible to increase uniformity of light provided to the display panel 110 placed at various optical distances, as well as improve a dark area of the display panel 110.

Figure 16:
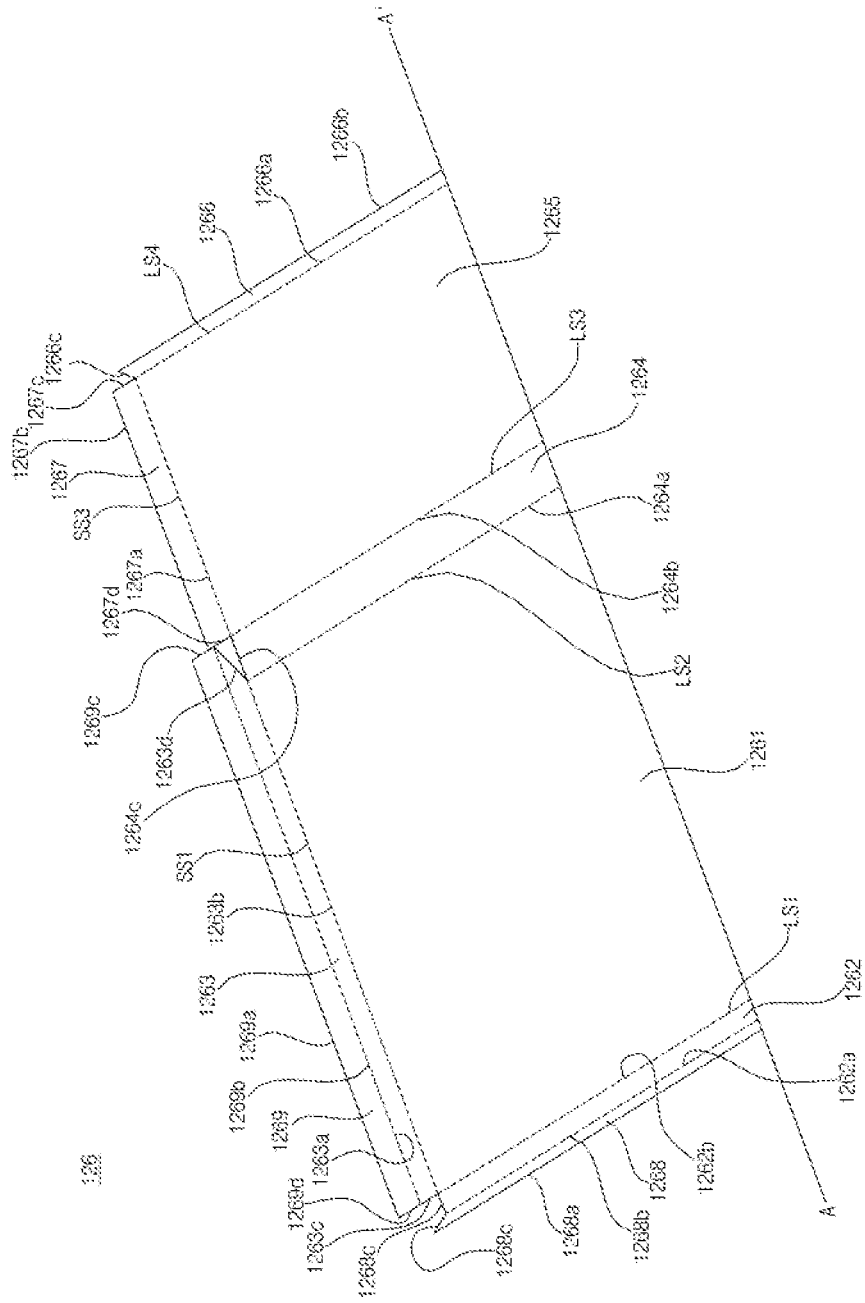
Figure 17:
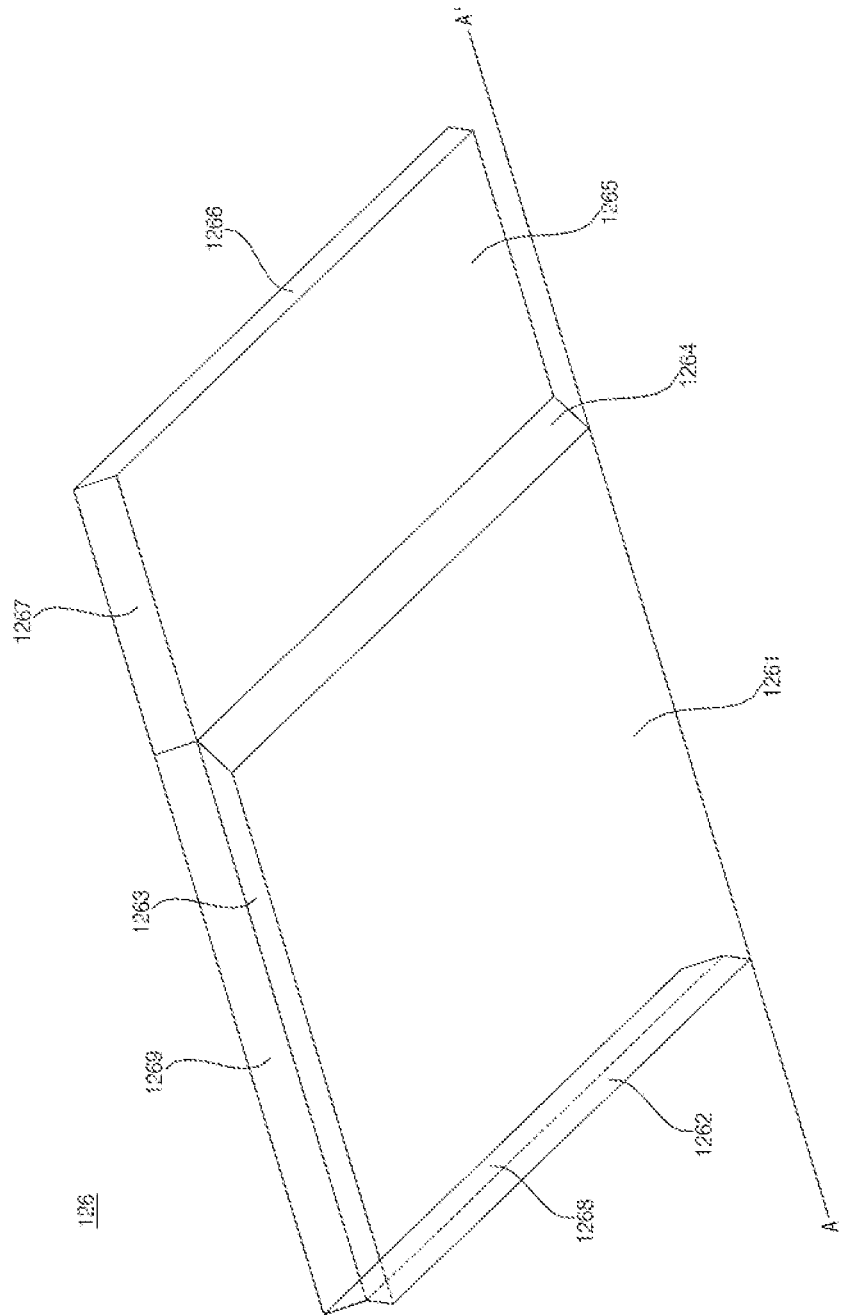

Referring to FIGS. 16 and 17 along with FIG. 7, the reflective sheet 126 may include a plurality of sheet parts 1261, 1262, 1263, 1264, 1265, 1266, 1267, 1268, and 1269. The reflective sheet 126 may be symmetrical about a center line A-A'. The first sheet 1261 may be disposed on the bottom 130B of the frame 130. The first sheet 1261 may maintain the first optical distance OD1 from the display panel 110. The first sheet 1261 may have a rectangular shape.

The second sheet 1262 may be connected to the first long side LS1 of the first sheet 1261. The second sheet 1262 may be elongated along the first long side LS1 of the first sheet 1261. The second sheet 1262 may be disposed on the first side part 130D1 of the frame 130. For example, the second sheet 1262 may be folded relative to the first sheet 1261, and a boundary between the first sheet 1261 and the second sheet 1262 is defined by a dashed line, and may be cut and connected at regular intervals.

The second sheet 1262 may include a first side 1262a, a second side 1262b, and a third side 1262c. The second side 1262b may form the boundary between the first sheet 1261 and the second sheet 1262 along with the first long side LS1 of the first sheet 1261. The first side 1262a may face the second side 1262b, and a length of the first side 1262a may be substantially equal to a length of the second side 1262b. The third side 1262c may connect the first side 1262a and the second side 1262b.

An eighth sheet 1268 may be connected to the second sheet 1262. The eighth sheet 1268 may be elongated along the first side 1262a of the second sheet 1262. For example, the eighth sheet 1268 may be folded relative to the second sheet 1262, and a boundary between the second sheet 1262 and the eighth sheet 1268 is defined by a dashed line, and may be cut and connected at regular intervals.

The eighth sheet 1268 may include a first side 1268a, a second side 1268b, and a third side 1268c. The second side 1268b may overlap the first side 1262a of the second sheet 1262. The first side 1268a may face the second side 1268b or may be parallel to the second side 1268b. A length of the first side 1268a may be greater than a length of the second side 1268b. The third side 1268c may connect the first side 1268a and the second side 1268b. The third side 1268c may form an acute angle with respect to the first side 1268a, and may form an obtuse angle with respect to the second side 126b.

The third sheet 1263 may be connected to the first short side SS1 of the first sheet 1261. The third sheet 1263 may be elongated along the first short side SS1 of the first sheet 1261. The third sheet 1263 may be disposed on the first side part 130D1 of the frame 130. For example, the third sheet 1263 may be folded relative to the first sheet 1261, and a boundary between the first sheet 1261 and the third sheet 1263 is defined by a dashed line, and may be cut and connected at regular intervals.

The third sheet 1263 may include a first side 1263a, a second side 1263b, a third side 1263c, and a fourth side 1263d. The second side 1263b may form the boundary between the first sheet 1261 and the third sheet 1263 along with the first short side SS1 of the first sheet 1261. The first side 1263a may face the second side 1263b. A length of the first side 1263a may be greater than a length of the second side 1263b. The third side 1263c may connect one end of the first side 1263a and one end of the second side 1263b. A fourth side 1263d may be connected to another end of the first side 1263a and another end of the second side 1263b.

A ninth sheet 1269 may be connected to the third sheet 1263. The ninth sheet 1269 may be elongated along the third sheet 1263. For example, the ninth sheet 1269 may be folded relative to the third sheet 1263, and a boundary between the third sheet 1263 and the ninth sheet 1269 is defined by a dashed line, and may be cut and connected at regular intervals.

The ninth sheet 1269 may include a first side 1269a, a second side 1269b, a third side 1269c, and a fourth side 1269d. The second side 1269b may overlap the first side 1263a of the third sheet 1263. The first side 1269a may face the second side 1269b or may be parallel to the second side 1269b. The third side 1269c may connect one end of the first side 1269a and one end of the second side 1269b, and the fourth side 1269d may connect another end of the first side 1269a and another end of the second side 1269b.

The fourth sheet 1264 may be connected to the second long side LS2 of the first sheet 1261. The second long side LS2 may face the first long side LS1 and may be parallel to the first long side LS1. A length of the second long side LS2 may be substantially equal to a length of the first long side LS1. For example, the fourth sheet 1264 may be folded relative to the first sheet 1261, and a boundary between the first sheet 1261 and the fourth sheet 1264 is defined by a dashed line, and may be cut and connected at regular intervals. The fourth sheet 1264 may be disposed on the stepped portion 1301 of the frame 130.

The fourth sheet 1264 may include a first side 1264a, a second side 1264b, and a third side 1264c. The first side 1264a may overlap the second long side LS2 of the first sheet 1261. The second side 1264b may face the first side 1264a and may be parallel to the first side 1264a. The third side 1264c may connect the first side 1264a and the second side 1264b.

The fifth sheet 1265 may be disposed on the side support 130S of the frame 130. The fifth sheet 1265 may maintain a second optical distance OD2 from the display panel 110. The fifth sheet 1265 may have a rectangular shape. The fifth sheet 1265 may include a first long side LS3, a second long side LS4, and a first short side SS3. The first long side LS3 may face the second long side LS2 of the first sheet 1261 and may be parallel to the second long side LS2. A length of the first long side LS3 of the fifth sheet 1265 may be substantially equal to a length of the second long side LS2 of the first sheet 1261. The second long side LS4 may face the first long side LS3 and may be parallel to the first long side LS3. A length of the second long side LS4 of the fifth sheet 1265 may be substantially equal to a length of the first long side LS3. The first short side SS3 of the fifth sheet 1265 may connect the first long side LS2 and the second long side LS4. A length of the first short side SS3 of the fifth sheet 1265 may be smaller than a length of the first short side SS1 of the first sheet 1261.

The sixth sheet 1266 may be connected to the second long side LS4 of the fifth sheet 1265. The sixth sheet 1266 may be elongated along the second long side LS4 of the fifth sheet 1265. For example, the sixth sheet 1266 may be folded relative to the fifth sheet 1265, and a boundary between the fifth sheet 1265 and the sixth sheet 1266 is defined by a dashed line, and may be cut and connected at regular intervals. The sixth sheet 1266 may be disposed on the second side part 130D2 of the frame 130.

The sixth sheet 1266 may include a first side 1266a, a second side 1266b, and a third side 1266c. The first side 1266a of the sixth sheet 1266 may overlap the second long side LS4 of the fifth sheet 1265. The second side 1266b may face the first side 1266a and may be parallel to the first side 1266a. A length of the second side 1266b may be greater than a length of the first side 1266a. The third side 1266c may connect the first side 1266a and the second side 1266b. The third side 1266c may form an obtuse angle with respect to the first side 1266a and may form an acute angle with respect to the second side 1266b.

A seventh sheet 1267 may be connected to the first short side SS3 of the fifth sheet 1265. The seventh sheet 1267 may be elongated along the first short side SS3 of the fifth sheet 1265. For example, the seventh sheet 1267 may be folded relative to the fifth sheet 1265, and a boundary between the fifth sheet 1265 and the seventh sheet 1267 is defined by a dashed line, and may be cut and connected at regular intervals. The seventh sheet 1267 may be disposed on the second side part 130D2 of the frame 130.

The seventh sheet 1267 may include a first side 1267a, a second side 1267b, a third side 1267c, and a fourth side 1267d. The first side 1267a may overlap the first short side SS3 of the fifth sheet 1265. The second side 1267b may face the first side 1267a or may be parallel to the first side 1267a. A length of the second side 1267b may be substantially equal to a length of the first side 1267a. The third side 1267c may connect one end of the first side 1267a and one end of the second side 1267b, and the fourth side 1267d may connect another end of the first side 1267a and another end of the second side 1267b. The fourth side 1267d may face the third side 1267c or may be parallel to the third side 1267c.

As the second sheet 1262 is folded relative to the first sheet 1261 and the third sheet 1263 is folded relative to the first sheet 1261, the third side 1262c of the second sheet 1262 may make contact with the third side 1263c of the third sheet 1263.

As the third sheet 1263 is folded relative to the first sheet 1261 and the fourth sheet 1264 is folded relative to the first sheet 1261, the fourth side 1263d of the third sheet 1263 may make contact with the third side 1264c of the fourth sheet 1264.

As the seventh sheet 1267 is folded relative to the fifth sheet 1265, the sixth sheet 1266 is folded relative to the fifth sheet 1265, the third side 1267c of the seventh sheet 1267 may make contact with the third side 1266c of the sixth sheet 1266. In addition, the fourth side 1267d of the seventh sheet 1267 may make contact with the third side 1269c of the ninth sheet 1269.

As the ninth sheet 1269 is folded relative to the third sheet 1263 and the eighth sheet 1268 is folded relative to the second sheet 1262, the fourth side 1269d of the ninth sheet 1269 may make contact with the third side 1268c of the eighth sheet 1268.

Accordingly, the reflective sheet 126 may be placed on the bottom 130B, the side support 130S, the stepped portion 130I, and/or the side parts 130D1 and 130D2 of the frame 130.

Figure 18:
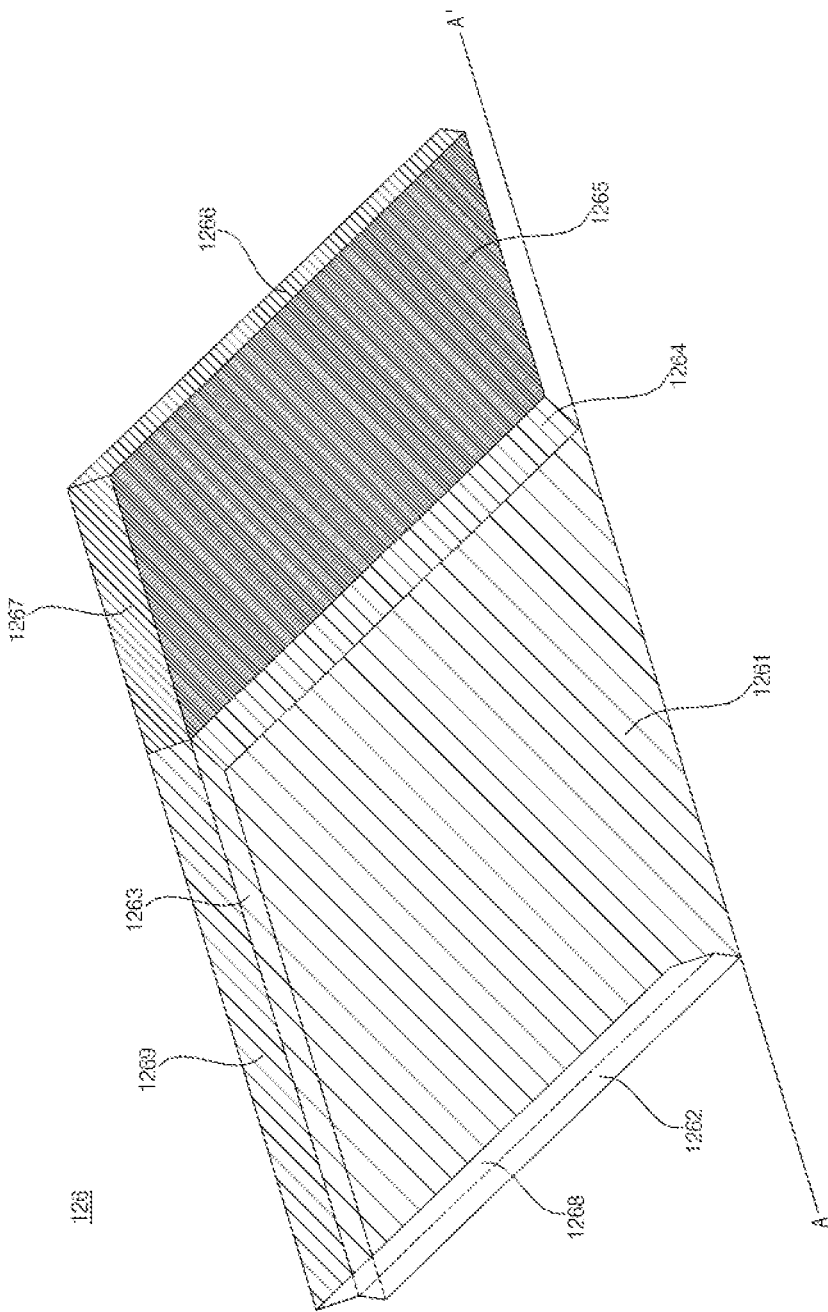
Figure 19:
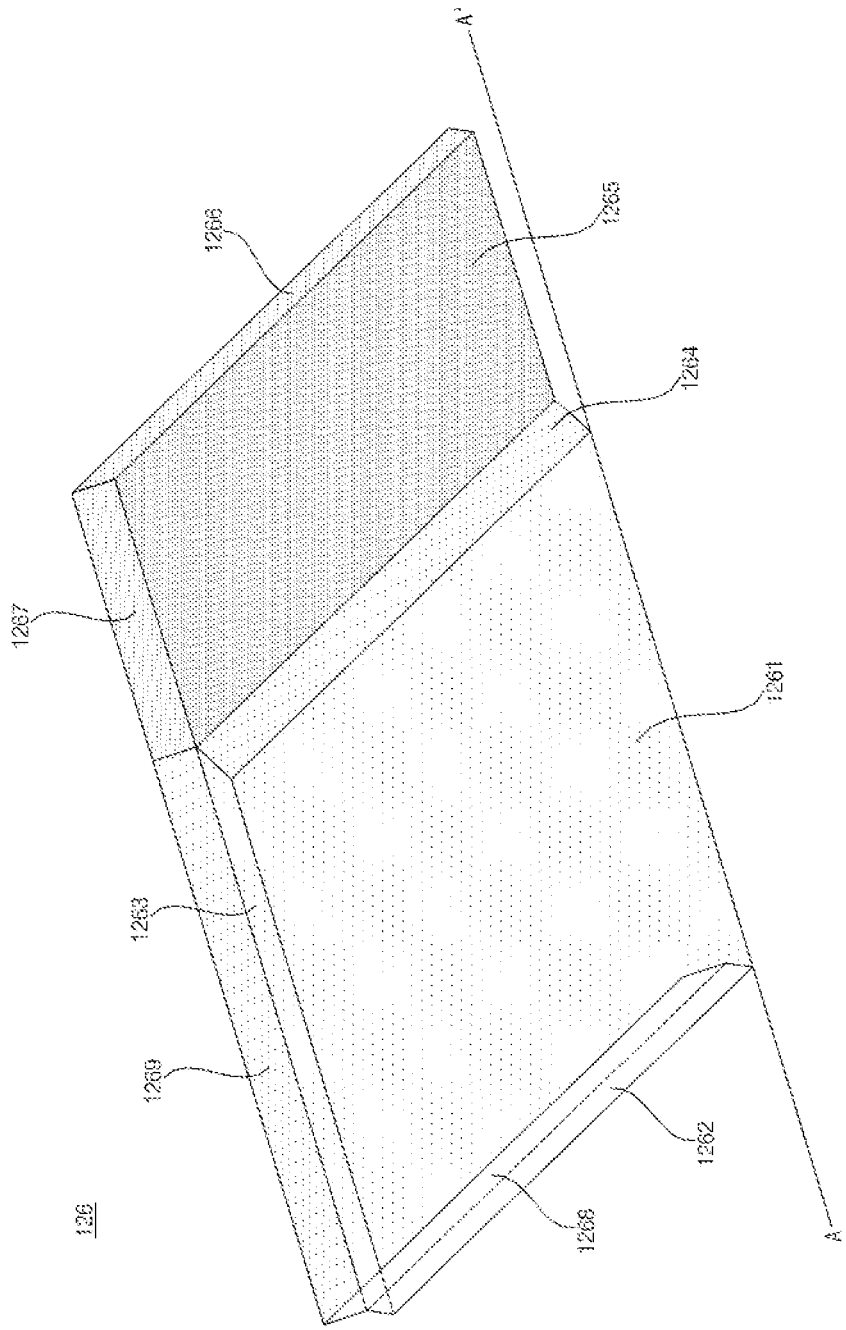

Referring to FIGS. 18 and 19, a reflectance of the first sheet 1261 may be substantially equal to a reflectance of the second sheet 1262 and/or the third sheet 1263. The reflectance of the first sheet 1261 may be greater than a reflectance of the fourth sheet 1264 and/or the ninth sheet 1269. The reflectance of the second sheet 1262 may be substantially equal to the reflectance of the third sheet 1263.

A reflectance of the fifth sheet 1265 may be lower than a reflectance of the sixth sheet 1266 and/or the seventh sheet 1267. The reflectance of the sixth sheet 1266 and/or the seventh sheet 1267 may be lower than the reflectance of the ninth sheet 1269 and/or fourth sheet 1264. The reflectance of the sixth sheet 1266 may be substantially equal to the reflectance of the seventh sheet 1267.

For example, a reflective material and/or a light absorbing material may be applied to the reflective sheet 126, and the reflectance of the reflective sheet 126 may be adjusted by adjusting concentration of the reflective material and/or the light absorbing material. In another example, a dot pattern may be formed on the reflective sheet 126. The reflectance of the reflective sheet 126 may be adjusted by adjusting the size, spacing, number density, color, and the like of the dot pattern. The dot pattern may be formed by punching the reflective sheet 126. By adjusting the reflectance of the reflective sheet 126 through the punched holes, the size, spacing, number density, and the like of the holes may be adjusted.

Accordingly, it is possible to increase uniformity of light provided to the display panel 110 placed at various optical distances, as well as improve a dark area of the display panel 110.

Referring to FIGS. 1 to 19, a display device includes: a display panel 110; a frame 130 disposed at a rear of the display panel 110; a substrate 122 and an optical assembly 14 which are disposed between the display panel 110 and the frame 130 and are disposed on the frame 130, wherein the frame 130 includes: a bottom 130B having a first optical distance OD1 from the display panel 110; and a side support 130S having a second optical distance OD2, which is smaller than the first optical distance OD1, from the display panel 110, wherein the substrate 122 includes: a first plurality of substrates 1224 and 1225 disposed on the bottom 130B of the frame 130; and a second plurality of substrates 1221, 1222, and 1223 disposed on the side support 130S of the frame 130, wherein a spacing between the first plurality of substrates 1224 and 1225 is greater than a spacing between the second plurality of substrates 1221, 1222, and 1223.

The optical assembly 124 may include: a first plurality of optical assemblies 124 disposed on each of the first plurality of substrates 1224 and 1225; and a second plurality of optical assemblies 124 disposed on each of the second plurality of substrates 1221, 1222, and 1223, wherein a spacing between the first plurality of optical assemblies 124 may be greater than a spacing between the second plurality of optical assemblies 124.

The frame 130 may include: a stepped portion 1301 connecting the bottom 130B and the side support 130S; a first side part 130D1 forming a periphery of the bottom 130B; and a second side part 130D2 forming a periphery of the side support 130S.

The display device may further include a reflective sheet 126 which covers the substrate 122, and through which the optical assembly 124 passes, wherein the reflective sheet 126 may include: a first sheet 1261 disposed on the bottom 130B of the frame 130; a fifth sheet 1265 disposed on the side support 130S of the frame 130; a fourth sheet 1264 disposed between the first sheet 1261 and the fifth sheet 1265, folded relative to the first sheet 1261, folded relative to the fifth sheet 1265, and disposed on the stepped portion 1301; a second sheet 1262 disposed opposite the fourth sheet 1264 with respect to the first sheet 1261, folded relative to the first sheet 1261, and disposed on the first side part 130D1; and a third sheet 1263 folded between the second sheet 1262 and the fourth sheet 1264 and relative to the first sheet 1261, and disposed on the first side part 130D1.

The reflective sheet 126 may further include: a sixth sheet 1266 disposed opposite the fourth sheet 1264 with respect to the fifth sheet 1265, and folded relative to the fifth sheet 1265; and a seventh sheet 1267 disposed between the fourth sheet 1264 and the sixth sheet 1266, and folded relative to the fifth sheet 1265.

The third sheet 1263 may include: a first side 1263a forming an outer side; a second side 1263b facing the first side 1263a and forming a boundary at which the second side 1263b is folded relative to the first sheet 1261; a third side 1263c adjacent to the second sheet 1262 and connecting the first side 1263a and the second side 1263b; a fourth side 1263d connected to the second side 1263b; and a fifth side 1263e connecting the first side 1263a and the fourth side 1263d, wherein the fourth side 1263d may form an obtuse angle with respect to the second side 1263b, and the fifth side 1263e may form an obtuse angle with respect to the first side 1263a and form an acute angle with respect to the fourth side 1263d.

As the third sheet 1263 is folded relative to the first sheet 1261 and the fourth sheet 1264 is folded relative to the first sheet 1261, the fourth side 1263d of the third sheet 1263 may make contact with one side 1264c of the fourth sheet 1264.

As the third sheet 1263 is folded relative to the first sheet 1261, the fourth sheet 1264 is folded relative to the first sheet 1261, the fifth sheet 1265 is folded relative to the fourth sheet 1264, and the seventh sheet 1267 is folded relative to the fifth sheet 1265, the fifth side 1263e of the third sheet 1263 may make contact with one side 1267d of the seventh sheet 1267.

As the second sheet 1292 is folded relative to the first sheet 1291 and the third sheet 1293 is folded relative to the first sheet 1291, the second sheet 1292 may make contact with the third sheet 1293, wherein the second sheet 1292 and the third sheet 1293 may be disposed on the first side part 130D1 of the frame 130.

As the sixth sheet 1266 is folded relative to the fifth sheet 1265 and the seventh sheet 1267 is folded relative to the fifth sheet 1265, the seventh sheet 1267 may make contact with the sixth sheet 1266, wherein the sixth sheet 1266 and the seventh sheet 1267 may be disposed on the second side part 130D2 of the frame 130.

The display device may further include at least one circuit board 315, 319, and 321 fixed to a rear surface of the side support 130S of the frame 130; and a back cover 150 covering the circuit boards 315, 319, and 321 and the rear surface of the side surface 130S, and fixed to the frame 130.

A reflectance of the first sheet 1261 may be greater than a reflectance of the fifth sheet 1265, and a reflectance of the fourth sheet 1264 may be lower than the reflectance of the first sheet 1261 and may be greater than the reflectance of the fifth sheet 1265.

A reflectance of the third sheet 1263 may be substantially equal to the reflectance of the fourth sheet 1264, and a reflectance of at least one of the sixth sheet 1266 and the seventh sheet 1267 may be lower than the reflectance of the fourth sheet 1264 and may be greater than the reflectance of the fifth sheet 1265.

A reflectance of a portion, defined by the third sheet 1263, the fourth sheet 1264, and the seventh sheet 1267, may be substantially equal to the reflectance of the first sheet 1261.

The reflectance of the reflective sheet 126 may be defined by any one of dots, holes, and patterns formed on a front surface of the reflective sheet 126, or may be defined by a concentration of a reflective material or a light absorbing material applied to the reflective sheet 126.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame disposed at a rear of the display panel;
   a substrate and an optical assembly disposed on the frame to be between the display panel and the frame,
   wherein the frame comprises:
   a bottom positioned a first optical distance from the display panel; and
   a side support positioned a second optical distance from the display panel, wherein the second optical distance is shorter than the first optical distance,
   wherein the substrate comprises:
   a first plurality of substrates disposed on the bottom of the frame; and
   a second plurality of substrates disposed on the side support of the frame,
   wherein a spacing between each of the first plurality of substrates is greater than a spacing between each of the second plurality of substrates.

2. The display device of claim 1, wherein the optical assembly comprises:
a first plurality of optical assemblies disposed on the first plurality of substrates; and
a second plurality of optical assemblies disposed on the second plurality of substrates,
wherein a spacing between each of the first plurality of optical assemblies is greater than a spacing between each of the second plurality of optical assemblies.

3. The display device of claim 1, wherein:
the bottom and the side support of the frame form a stepped portion; and
the frame comprises a first side part along a periphery of the bottom and a second side part along a periphery of the side support.

4. The display device of claim 3, further comprising a reflective sheet covering the substrate and configured to allow the optical assembly to pass therethrough,
wherein the reflective sheet comprises:
a first sheet disposed on the bottom of the frame;
a fifth sheet disposed on the side support of the frame;
a fourth sheet disposed between the first sheet and the fifth sheet, wherein the fourth sheet is folded relative to the first sheet and to the fifth sheet, and disposed on the stepped portion;
a second sheet disposed opposite the fourth sheet with respect to the first sheet, wherein the second sheet is folded relative to the first sheet, and disposed on the first side part; and
a third sheet extending along a side of the first sheet between the second sheet and the fourth sheet, wherein the third sheet is folded with respect to the first sheet and disposed on the first side part.

5. The display device of claim 4, wherein the reflective sheet further comprises:
a sixth sheet disposed opposite the fourth sheet with respect to the fifth sheet, and folded relative to the fifth sheet; and
a seventh sheet disposed adjacent to the sixth sheet, and folded relative to the fifth sheet.

6. The display device of claim 5, wherein the third sheet comprises:
a first side forming an outer side;
a second side opposite the first side and forming a boundary at which the second side is folded relative to the first sheet;
a third side adjacent to the second sheet and extending between the first side and the second side;
a fourth side connected to the second side; and
a fifth side extending between the first side and the fourth side,
wherein the fourth side forms an obtuse angle with respect to the second side, and the fifth side forms an obtuse angle with respect to the first side and forms an acute angle with respect to the fourth side.

7. The display device of claim 6, wherein as the third sheet is folded relative to the first sheet and the fourth sheet is folded relative to the first sheet, the fourth side of the third sheet contacts one side of the fourth sheet.

8. The display device of claim 7, wherein as the third sheet is folded relative to the first sheet, the fourth sheet is folded relative to the first sheet, the fifth sheet is folded relative to the fourth sheet, and the seventh sheet is folded relative to the fifth sheet, the fifth side of the third sheet contacts one side of the seventh sheet.

9. The display device of claim 8, wherein as the second sheet is folded relative to the first sheet and the third sheet is folded relative to the first sheet, the second sheet contacts the third sheet, and
wherein the second sheet and the third sheet are disposed on the first side part of the frame.

10. The display device of claim 8, wherein as the sixth sheet is folded relative to the fifth sheet and the seventh sheet is folded relative to the fifth sheet, the seventh sheet contacts the sixth sheet, wherein the sixth sheet and the seventh sheet are disposed on the second side part of the frame.

11. The display device of claim 5, wherein:
a reflectance of the first sheet is greater than a reflectance of the fifth sheet; and
a reflectance of the fourth sheet is lower than the reflectance of the first sheet and is greater than the reflectance of the fifth sheet.

12. The display device of claim 11, wherein:
a reflectance of the third sheet is substantially equal to the reflectance of the fourth sheet; and
a reflectance of at least one of the sixth sheet or the seventh sheet is lower than the reflectance of the fourth sheet and is greater than the reflectance of the fifth sheet.

13. The display device of claim 12, wherein a reflectance of a portion defined by the third sheet, the fourth sheet, and the seventh sheet, is substantially equal to the reflectance of the first sheet.

14. The display device of claim 13, wherein a reflectance of the reflective sheet is defined by dots, holes, or patterns formed on a front surface of the reflective sheet, or by a concentration of a reflective material or a light absorbing material applied to the reflective sheet.

15. The display device of claim 1, further comprising at least one circuit board fixed to a rear surface of the side support of the frame; and
a back cover coupled to the frame and covering the at least one circuit board and the rear surface of the side support of the frame.

* * * * *